United States Patent
Sasaki

(10) Patent No.: US 11,736,830 B2
(45) Date of Patent: Aug. 22, 2023

(54) SOLID-STATE IMAGING ELEMENT

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventor: Hiroki Sasaki, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 0 days.

(21) Appl. No.: 17/954,415

(22) Filed: Sep. 28, 2022

(65) Prior Publication Data

US 2023/0106422 A1 Apr. 6, 2023

(30) Foreign Application Priority Data

Oct. 6, 2021 (JP) ................................ 2021-164836

(51) Int. Cl.
*H04N 25/709* (2023.01)
*H04N 25/707* (2023.01)
*H04N 25/766* (2023.01)
*H04N 25/47* (2023.01)

(52) U.S. Cl.
CPC ......... *H04N 25/709* (2023.01); *H04N 25/707* (2023.01); *H04N 25/766* (2023.01)

(58) Field of Classification Search
CPC .. H04N 25/709; H04N 25/707; H04N 25/766; H04N 25/47; H04N 25/70; H04N 25/703; H04N 25/44; H04N 25/40; H04N 25/443; H04N 25/445
See application file for complete search history.

(56) References Cited

U.S. PATENT DOCUMENTS

| 11,240,454 | B2* | 2/2022 | Gao | ...................... H04N 25/79 |
| 2020/0084403 | A1* | 3/2020 | Suh | ........................ H04N 25/77 |
| 2021/0075986 | A1* | 3/2021 | Panicacci | ............. H04N 25/443 |
| 2022/0201236 | A1* | 6/2022 | Gao | .................. H01L 27/14612 |

FOREIGN PATENT DOCUMENTS

JP 2020-088724 A 6/2020

* cited by examiner

*Primary Examiner* — Albert H Cutler
(74) *Attorney, Agent, or Firm* — Posz Law Group, PLC

(57) ABSTRACT

A solid-state imaging element includes a pixel and an image processing unit. The pixel has a common transistor, a charge accumulation unit, and a power supply. The common transistor has a first terminal and a second terminal. The common transistor maintains a voltage of the first terminal at a predetermined voltage with a voltage applied from the power supply and outputs a voltage corresponding to a change in a voltage of the charge accumulation unit from the second terminal, based on a condition that an element voltage is a ground voltage. The common transistor outputs a voltage corresponding to a change in a voltage of the charge accumulation unit from the first terminal, based on the element voltage is higher than the ground voltage. The image processing unit generates a luminance image according to a change in the voltage output from the second terminal of the common transistor.

4 Claims, 9 Drawing Sheets

SOLID-STATE IMAGING ELEMENT

CROSS REFERENCE TO RELATED APPLICATION

This application is based on Japanese Patent Application No. 2021-164836 filed on Oct. 6, 2021, the disclosure of which is incorporated herein by reference.

TECHNICAL FIELD

The present disclosure relates to a solid-state imaging element.

BACKGROUND

A solid-state imaging element may detect an event indicating a temporal change in an amount of light in a pixel and generate a luminance image.

SUMMARY

The present disclosure describes a solid-state imaging element including a pixel and an image processing unit.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
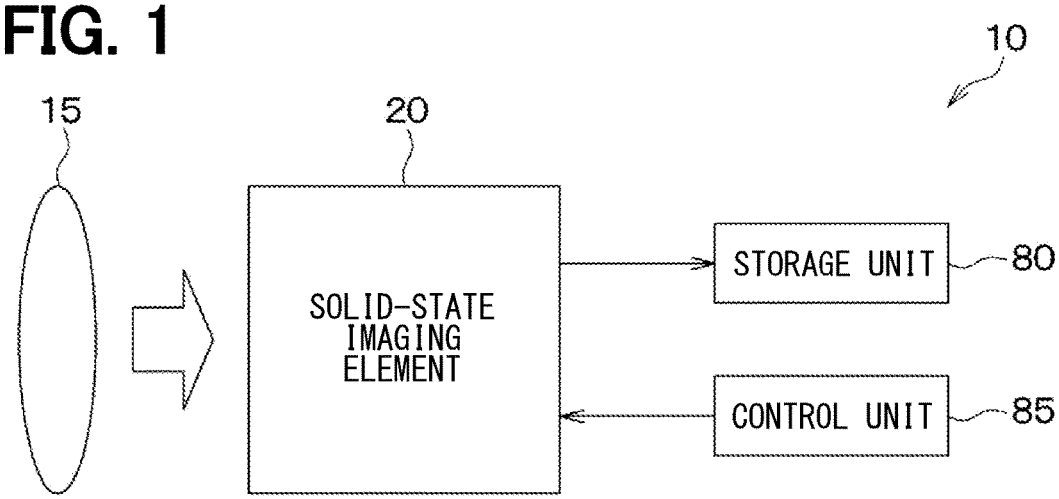
FIG. 1 illustrates a structural view of an imaging apparatus including a solid-state imaging element according to a first embodiment.

A solid-state imaging element may include, for example, a photoelectric conversion element, a floating diffusion layer, an amplifier transistor, a select transistor, a vertical signal line, a connection transistor, an N-type transistor, and a comparator.

According to the study by the inventor in the present application, in the solid-state imaging element, a photocurrent from the photoelectric conversion element is converted into a voltage through the floating diffusion layer. The converted voltage flows as a signal to the vertical signal line via the amplifier transistor and the select transistor, thereby generating a luminance image. In addition, branching is performed in the floating diffusion layer, and the photocurrent from the photoelectric conversion element is converted into a voltage by a voltage conversion unit via the floating diffusion layer, the connection transistor, the N-type transistor, and the like. The converted voltage flows as a signal to the comparator, thereby detecting the event. Therefore, this solid-state imaging element needs to further include a transistor for generating a luminance image and a transistor for detecting the event, and thus the number of transistors increases.

According to a first aspect of the present disclosure, the solid-state imaging element includes a pixel and an image processing unit. The pixel includes a photoelectric element, a charge accumulation unit, a power supply, a transistor, a drive circuit, a common transistor, and a detection unit. The photo conversion element generates, by photoelectric conversion, a photocurrent corresponding to an amount of light. The charge accumulation unit accumulates a charge corresponding to the photocurrent, and outputs a voltage corresponding to an amount of the charge accumulated in the charge accumulation unit. The transistor is connected to the power supply. The drive circuit applies a voltage to the transistor to turn on the transistor. The common transistor has a first terminal and a second terminal. The common transistor maintains a voltage of the first terminal at a predetermined voltage with a voltage applied from the power supply and outputs a voltage corresponding to a change in the voltage of the charge accumulation unit from the second terminal, based on a condition that an element voltage as the voltage applied from the drive circuit to the transistor is a ground voltage. The common transistor further outputs a voltage corresponding to a change in the voltage of the charge accumulation unit from the first terminal, based on a condition that the element voltage is higher than the ground voltage. The detection unit detects whether the voltage from the first terminal of the common transistor has increased or decreased. The image processing unit generates a luminance image based on a change in the voltage output from the second terminal of the common transistor, based on a condition that the element voltage is the ground voltage.

According to a second aspect of the present disclosure, a solid-state imaging element includes a first pixel, a second pixel, and an image processing unit. The first pixel includes a first photoelectric conversion element configured to generate, by photoelectric conversion, a first photocurrent corresponding to an amount of light. The second pixel includes a second photoelectric conversion element configured to generate, by photoelectric conversion, a second photocurrent corresponding to an amount of light of a color different from a color of light that reacts in the first photoelectric conversion element. The first pixel and the second pixel jointly include a charge accumulation unit, a power supply, a transistor, a drive circuit, a common transistor and a detection unit. The charge accumulation unit accumulates a charge corresponding to the first photocurrent and the second photocurrent, and outputs a voltage corresponding to an amount of the charge accumulated in the charge accumulation unit. The transistor is connected to the power supply. The drive circuit applies a voltage to the transistor to turn on the transistor. The common transistor has a first terminal and a second terminal. The common transistor maintains a voltage of the first terminal at a predetermined voltage with a voltage applied from the power supply, and outputs a voltage corresponding to a change in the voltage of the charge accumulation unit from the second terminal, based on a condition that an element voltage as the voltage applied from the drive circuit to the transistor is a ground voltage. The common transistor further outputs a voltage corresponding to a change in the voltage of the charge accumulation unit from the first terminal, based on a condition that the element voltage is higher than the ground voltage. The detection unit detects whether the voltage from the first terminal of the common transistor has increased or decreased. The image processing unit generates a luminance image according to a change in the voltage output from the second terminal of the common transistor, based on a condition that the element voltage is the ground voltage.

According to a third aspect of the present disclosure, the solid-state imaging element includes a pixel and an image processing unit. The pixel includes a photoelectric element, a charge accumulation unit, a power supply, a transistor, a drive circuit, a common transistor, and a detection unit. The photo conversion element generates, by photoelectric conversion, a photocurrent corresponding to an amount of light. The charge accumulation unit accumulates a charge corresponding to the photocurrent, and outputs a voltage corresponding to an amount of the charge accumulated in the charge accumulation unit. The transistor is connected to the power supply. The drive circuit applies a voltage to the transistor to turn on the transistor. The common transistor has a first terminal and a second terminal. The common transistor maintains a voltage of the first terminal at a predetermined voltage with a voltage applied from the power supply and outputs a voltage corresponding to a change in the voltage of the charge accumulation unit from the second terminal, based on a condition that an element voltage as the voltage applied from the drive circuit to the transistor is equal to or higher than the voltage of the power supply. The common transistor further outputs a voltage corresponding to a change in the voltage of the charge accumulation unit from the first terminal, the element voltage is lower than the voltage of the power supply. The detection unit detects whether the voltage from the first terminal of the common transistor has increased or decreased. The image processing unit generates a luminance image based on a change in the voltage output from the second terminal of the common transistor, based on a condition that the element voltage is equal to or higher than the voltage of the power supply.

According to each of the above structures, when a luminance image is generated, a sharing transistor outputs, from its other end, a voltage corresponding to a change in the voltage of a charge accumulation unit. When an event indicating a temporal change in an amount of light in a pixel is detected, the sharing transistor outputs, from its one end, a voltage corresponding to a change in the voltage of the charge accumulation unit. Therefore, it is not necessary to further include a transistor for generating a luminance image and a transistor for detecting the event. Therefore, the number of transistors can be reduced.

The following describes multiple embodiments with reference to the drawings. Hereinafter, in the respective embodiments, substantially the same configurations are denoted by identical symbols, and repetitive description will be omitted.

First Embodiment

A solid-state imaging element 20 of the present embodiment is included in an imaging apparatus 10. The imaging apparatus 10 is mounted on, for example, a non-illustrated vehicle. First, the imaging apparatus 10 will be described.

The imaging apparatus 10 generates a luminance image and generates an event. Note that the event is obtained by asynchronously converting an increase or decrease due to a temporal change in an amount of light in a pixel into data.

Specifically, the imaging apparatus 10 includes a lens 15, the solid-state imaging element 20, a storage unit 80, and a control unit 85, as illustrated in FIG. 1. The lens 15 collects light from the outside of the imaging apparatus 10 and guides the collected light to the solid-state imaging element 20 to be described later. The solid-state imaging element 20 outputs a signal, corresponding to a change in the amount of the light guided from the lens 15, to the storage unit 80 to be described later. Details of the solid-state imaging element 20 will be described later.

The storage unit 80 includes a nonvolatile memory such as a flash memory, thereby storing a signal from the solid-state imaging element 20. The data stored in the storage unit 80 can be read out from the storage unit 80.

The control unit 85 mainly includes a microcomputer and the like, and includes a CPU, a ROM, a flash memory, a RAM, an I/O, a drive circuit, a bus line connecting these components, and the like. The control unit 85 executes a program stored in the ROM, thereby controlling the voltage in the solid-state imaging element 20 on the basis of a signal from a system of the non-illustrated vehicle. As a result, the control unit 85 changes the signal output from the solid-state imaging element 20.

The imaging apparatus 10 is configured as described above. Next, details of the solid-state imaging element 20 will be described.

Figure 2:
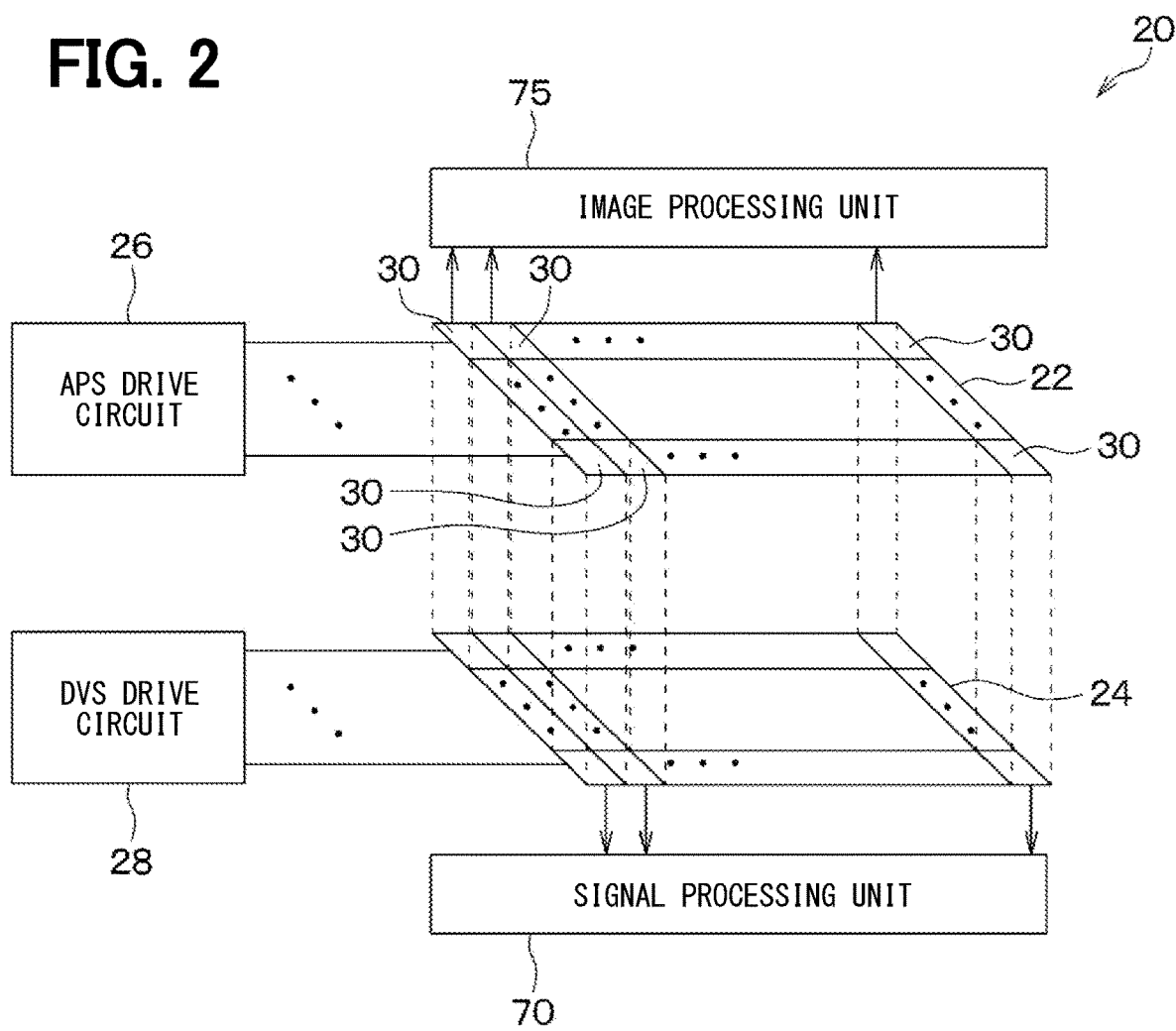
FIG. 2 illustrates a structural view of the solid-state imaging element.
Figure 3:
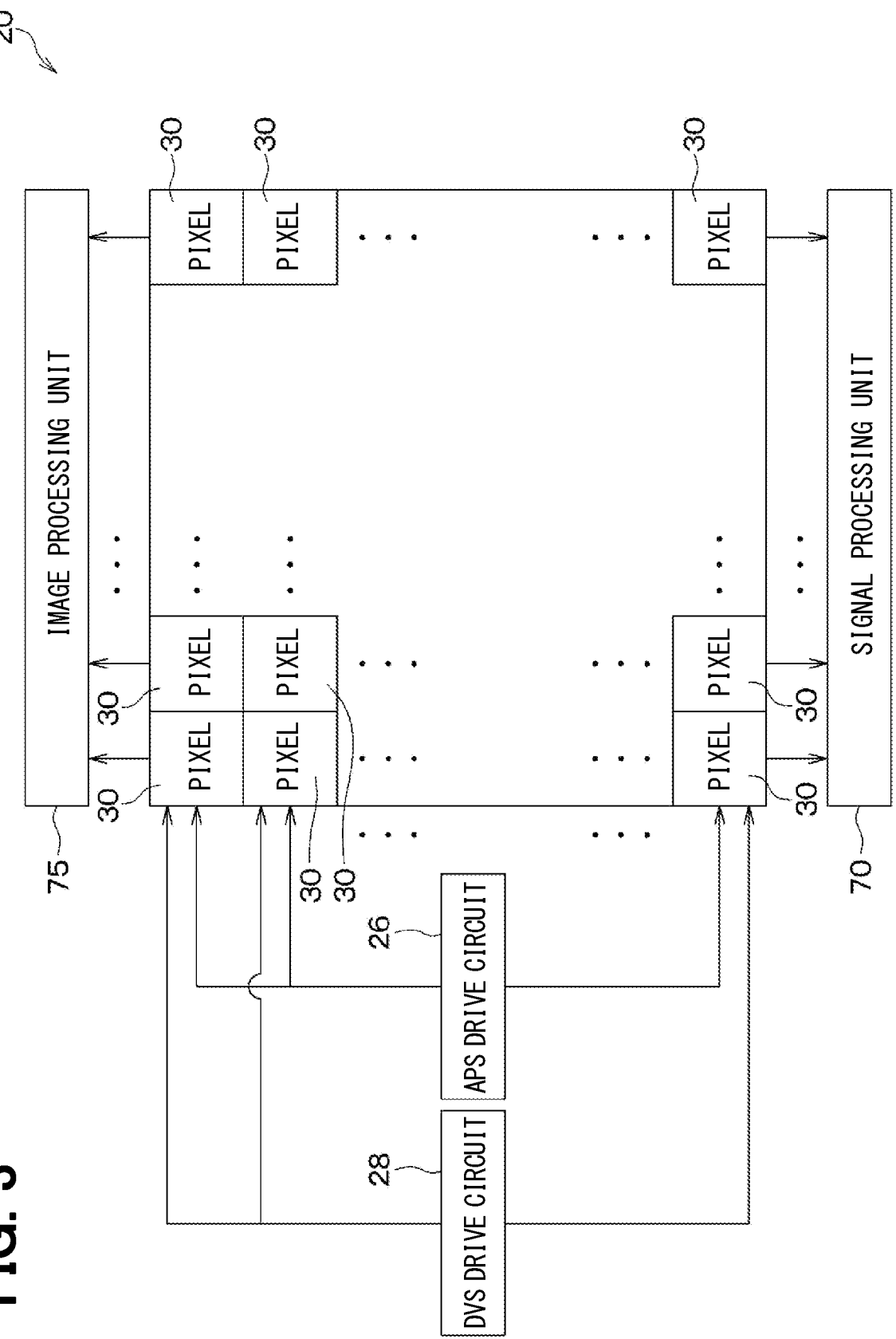
FIG. 3 illustrates a structural view of the solid-state imaging element.
Figure 4:
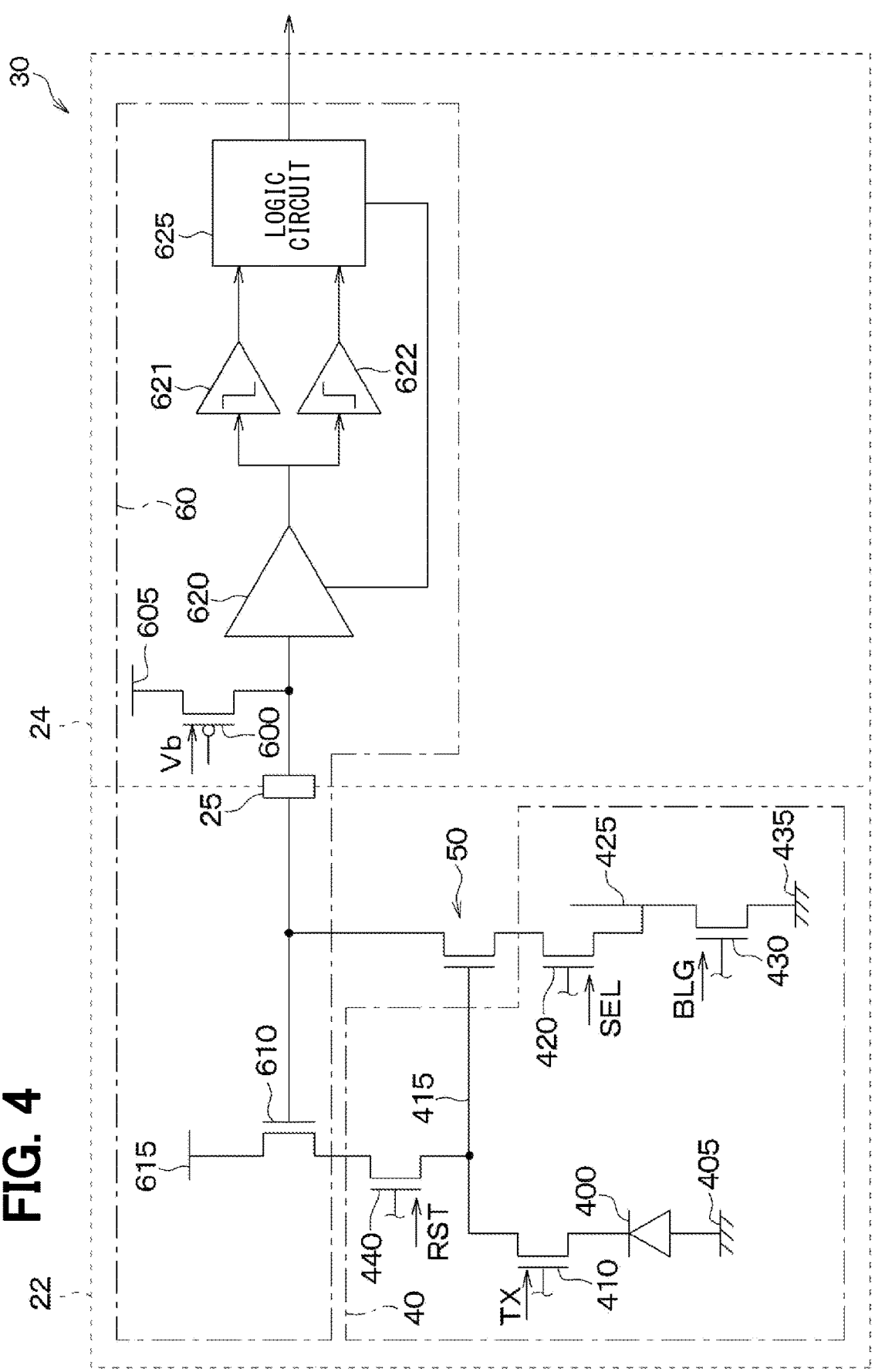
FIG. 4 illustrates a structural view of a pixel of the solid-state imaging element.

As illustrated in FIGS. 2 to 4, the solid-state imaging element 20 includes a light receiving chip 22, a circuit chip 24, a joint portion 25, an APS drive circuit 26, a DVS drive circuit 28, multiple pixels 30, a signal processing unit 70, and an image processing unit 75. Note that APS is an abbreviation for Active Pixel Sensor. DVS is an abbreviation for Dynamic Vision Sensor.

In the light receiving chip 22 and the circuit chip 24, Cu pads thereof are exposed at a joint interface between both the portions. The exposed respective Cu are joined to form the joint portion 25. Cu means copper.

On the basis of a signal from the control unit 85, the APS drive circuit 26 applies a voltage to an APS circuit 40 of the pixel 30 to be described later.

On the basis of a signal from the control unit 85, the DVS drive circuit 28 applies a voltage to a DVS circuit 60 of the pixel 30 to be described later.

The multiple pixels 30 are formed by the light receiving chips 22 and the circuit chips 24. These pixels 30 are arrayed in a two-dimensional lattice pattern. The pixel 30 includes the APS circuit 40, an amplifier transistor 50, and the DVS circuit 60.

The APS circuit 40 is disposed on the light receiving chip 22. The APS circuit 40 includes a photodiode 400, a PD ground 405, a transfer transistor 410, and a floating diffusion layer 415. The APS circuit 40 further includes a select transistor 420, a bit line 425, a BL transistor 430, a BL ground 435, and a reset transistor 440. Note that PD is an abbreviation for PhotoDiode. BL is an abbreviation for BitLine.

The anode of the photodiode 400 is connected to the PD ground 405. The photodiode 400 generates, by photoelectric conversion, a photocurrent corresponding to the amount of the light guided from the lens 15. Furthermore, the photodiode 400 allows the generated photocurrent to flow to the transfer transistor 410 to be described later.

The transfer transistor 410 is an N-channel MOSFET. The source of the transfer transistor 410 is connected to the cathode of the photodiode 400. The gate of the transfer transistor 410 is connected to the APS drive circuit 26. Therefore, a voltage from the APS drive circuit 26 is applied to the gate of the transfer transistor 410, so that the transfer transistor 410 is turned on or off. When turned on, the transfer transistor 410 transfers a charge, corresponding to the photocurrent flowing from the photodiode 400, to the floating diffusion layer 415 to be described later. When turned off, the transfer transistor 410 does not transfer a charge, corresponding to the photocurrent flowing from the photodiode 400, to the floating diffusion layer 415 to be described later. Note that the drain of the transfer transistor 410 may be connected to the cathode of the photodiode 400.

The floating diffusion layer 415 is connected to the drain of the transfer transistor 410. The floating diffusion layer 415 accumulates the charge transferred from the transfer transistor 410. The floating diffusion layer 415 applies a voltage, corresponding to the amount of the charges accumulated, to the amplifier transistor 50 to be described later. Note that the floating diffusion layer 415 may be connected to the source of the transfer transistor 410.

The select transistor 420 is an N-channel MOSFET. The gate of the select transistor 420 is connected to the APS drive circuit 26. Therefore, a voltage from the APS drive circuit 26 is applied to the gate of the select transistor 420, so that the select transistor 420 is turned on or off. When turned on, the select transistor 420 applies a voltage from the amplifier transistor 50 to be described later to the bit line 425 to be described later. When turned off, the select transistor 420 does not apply a voltage from the amplifier transistor 50 to be described later to the bit line 425 to be described later.

The bit line 425 is connected to the source of the select transistor 420, the BL transistor 430 to be described later, and the image processing unit 75.

The BL transistor 430 is an N-channel MOSFET. The drain of the BL transistor 430 is connected to the bit line 425. The source of the BL transistor 430 is connected to the BL ground 435. The gate of the BL transistor 430 is connected to the APS drive circuit 26. Therefore, a voltage from the APS drive circuit 26 is applied to the gate of the BL transistor 430, so that the BL transistor 430 is turned on or off. When the BL transistor 430 is turned on, the bit line 425 and the BL ground 435 are connected. When the BL transistor 430 is turned off, the bit line 425 and the BL ground 435 are not connected.

The reset transistor 440 is an N-channel MOSFET. The drain of the reset transistor 440 is connected to the source of a feedback transistor 610 to be described later. The source of the reset transistor 440 is connected between the transfer transistor 410 and the floating diffusion layer 415. The gate of the reset transistor 440 is connected to the APS drive circuit 26. Therefore, a voltage from the APS drive circuit 26 is applied to the gate of the reset transistor 440, so that the reset transistor 440 is turned on or off. When turned on, the reset transistor 440 applies a voltage from an FB power supply 615 to be described later to the floating diffusion layer 415, so that the voltage of the floating diffusion layer 415 is made a voltage corresponding to the voltage of the FB power supply 615. As a result, the reset transistor 440 initializes the state of the floating diffusion layer 415. When turned off, the reset transistor 440 does not apply a voltage from the FB power supply 615 to be described later to the floating diffusion layer 415.

The amplifier transistor 50 is an N-channel MOSFET. The drain of the amplifier transistor 50 is connected between the joint portion 25 and the feedback transistor 610 to be described later. The source of the amplifier transistor 50 is connected to the drain of the select transistor 420. The gate of the amplifier transistor 50 is connected to the floating diffusion layer 415. Therefore, a voltage from the floating diffusion layer 415 is applied to the gate of the amplifier transistor 50, so that the amplifier transistor 50 is turned on or off. When turned on, the amplifier transistor 50 applies a voltage from the floating diffusion layer 415, to the select transistor 420, the feedback transistor 610 to be described later, and an operational amplifier 620 to be described later. When turned off, the amplifier transistor 50 does not apply a voltage from the floating diffusion layer 415, to the select transistor 420, the feedback transistor 610 to be described later, and the operational amplifier 620 to be described later.

The DVS circuit 60 includes a switching transistor 600, a switching power supply 605, the feedback transistor 610, the FB power supply 615, the operational amplifier 620, a first comparator 621, a second comparator 622, and a logic circuit 625. The feedback transistor 610 and the FB power supply 615 are disposed on the light receiving chip 22. The switching transistor 600, the switching power supply 605, the operational amplifier 620, the first comparator 621, the second comparator 622, and the logic circuit 625 are disposed on the circuit chip 24. FB is an abbreviation for FeedBack.

The switching transistor 600 is a P-channel MOSFET. The drain of the switching transistor 600 is connected to the switching power supply 605. The source of the switching transistor 600 is connected between the joint portion 25 and the operational amplifier 620 to be described later. The gate of the switching transistor 600 is connected to the DVS drive circuit 28. Therefore, a voltage from the DVS drive circuit 28 is applied to the gate of the switching transistor 600, so that the switching transistor 600 is turned on or off. When turned on, the switching transistor 600 applies a voltage from the switching power supply 605 to the amplifier transistor 50. When turned off, the switching transistor 600 does not apply a voltage from switching power supply 605 to the amplifier transistor 50.

The feedback transistor 610 is an N-channel MOSFET. The drain of the feedback transistor 610 is connected to the FB power supply 615. The source of the feedback transistor 610 is connected to the reset transistor 440 to be described later. The gate of the feedback transistor 610 is connected to the drain of the amplifier transistor 50 and the joint portion 25. Therefore, a voltage from the drain of the amplifier transistor 50 and the joint portion 25 is applied to the gate of the feedback transistor 610, so that the feedback transistor 610 is turned on or off. When turned on, the feedback transistor 610 applies a voltage from the amplifier transistor 50 and a voltage from the joint portion 25 to the reset transistor 440. When turned off, the feedback transistor 610 does not apply a voltage from the amplifier transistor 50 and a voltage from the joint portion 25 to the reset transistor 440.

The operational amplifier 620 amplifies a voltage from the amplifier transistor 50. In addition, the operational amplifier 620 applies the amplified voltage to the first comparator 621 and the second comparator 622.

When a voltage from the operational amplifier 620 is equal to or higher than a first voltage threshold, the first comparator 621 outputs a signal whose voltage level is a low level to the logic circuit 625 to be described later. When a voltage from the operational amplifier 620 is lower than the first voltage threshold, the first comparator 621 outputs a signal whose voltage level is a high level to the logic circuit 625 to be described later. Thus, the first comparator 621 determines whether the photocurrent from the photodiode 400 has decreased by determining whether the voltage from the operational amplifier 620 has decreased. Note that the first voltage threshold is set by experiment, simulation, or the like.

When a voltage from the operational amplifier 620 is lower than a second voltage threshold, the second comparator 622 outputs a signal whose voltage level is a low level to the logic circuit 625 to be described later. When a voltage from the operational amplifier 620 is equal to or higher than the second voltage threshold, the second comparator 622 outputs a signal whose voltage level is a high level to the logic circuit 625 to be described later. Thus, the second comparator 622 determines whether the photocurrent from the photodiode 400 has increased by determining whether the voltage from the operational amplifier 620 has increased. Note that the second voltage threshold is set by experiment, simulation, or the like.

On the basis of the signal from the first comparator 621 and the signal from the second comparator 622, the logic circuit 625 outputs, to the signal processing unit 70 to be described later, the position of the pixel 30 and the polarity of the event that correspond to the logic circuit 625. After outputting to the signal processing unit 70, the logic circuit 625 resets the signal from the first comparator 621 and the signal from the second comparator 622. Furthermore, the logic circuit 625 outputs a signal, indicating that they have been reset, to the operational amplifier 620. Note that the position of the pixel 30 is represented by, for example, XY coordinates. The polarity of the event is, for example, +1 when the photocurrent from the photodiode 400 has increased. The polarity of the event is, for example, −1 when the photocurrent from the photodiode 400 has decreased.

The signal processing unit 70 mainly includes a microcomputer and the like, and includes a CPU, a ROM, a flash memory, a RAM, an I/O, a drive circuit, a bus line connecting these components, and the like. The signal processing unit 70 executes a program stored in the ROM, thereby outputting, to the outside, signals about the position of the pixel 30 and the polarity of the event that have been acquired from the logic circuit 625. Furthermore, the signal processing unit 70 generates an event frame by performing signal processing such as image recognition processing. The signal processing unit 70 outputs the generated event frame to the outside. For example, the position of the pixel 30, the polarity of the event, and the event frame that are from the signal processing unit 70 are stored in the storage unit 80. Note that the event frame is what visualizes the event.

The image processing unit 75 mainly includes a microcomputer and the like, and includes a CPU, a ROM, a flash memory, a RAM, an I/O, a drive circuit, a bus line connecting these components, and the like. The image processing unit 75 executes a program stored in the ROM, thereby generating the luminance image by performing processing, such as AD conversion, CDS processing, and dark current correction, on the signal acquired from the bit line 425 of each pixel 30. Furthermore, the image processing unit 75 outputs the generated luminance image to the outside. The luminance image from the image processing unit 75 is stored, for example, in the storage unit 80.

The solid-state imaging element 20 is configured as described above. The solid-state imaging element 20 generates the luminance image and detects the event. Next, generation of the luminance image by the solid-state imaging element 20 will be described with reference to the time charts of FIG. 5.

Here, for this description, the following terms are defined. As illustrated in FIG. 4, the gate voltage of the switching transistor 600 is defined as Vb. The gate voltage of the select transistor 420 is defined as SEL. The gate voltage of the reset transistor 440 is defined as RST. The gate voltage of the transfer transistor 410 is defined as TX. The gate voltage of the BL transistor 430 is defined as BLG. A set of the pixels 30 arrayed in the horizontal direction is defined as a row.

Returning to FIG. 5, it is assumed that the vehicle on which the imaging apparatus 10 is mounted is operated by a driver, and thus, it is necessary to display the luminance image toward the driver at time t0. At this time, the system of the vehicle outputs, to the control unit 85, a signal indicating that it is necessary to display the luminance image toward the driver. With the signal from this system, the control unit 85 outputs a signal for generating the luminance image to the DVS drive circuit 28 and the APS drive circuit 26.

At this time, the DVS drive circuit 28 sets Vb to a ground voltage Vb_G. As a result, the switching transistor 600 is turned on because it is a P-channel MOSFET. Therefore, a voltage from the switching power supply 605 is applied to the drain of the amplifier transistor 50 via the switching transistor 600 and the joint portion 25. As a result, the voltage of the drain of the amplifier transistor 50 becomes higher than the sum of the gate voltage of the amplifier transistor 50 and a threshold voltage, so that the state of the amplifier transistor 50 is saturated. Therefore, a voltage from the floating diffusion layer 415 is applied to the select transistor 420 via the amplifier transistor 50. Furthermore, a voltage from the switching power supply 605 is applied to the gate of the feedback transistor 610 via the switching transistor 600 and the joint portion 25, so that the feedback transistor 610 is turned on. Note that the ground voltage Vb_G is a voltage at which the imaging apparatus 10 is grounded.

Figure 5:
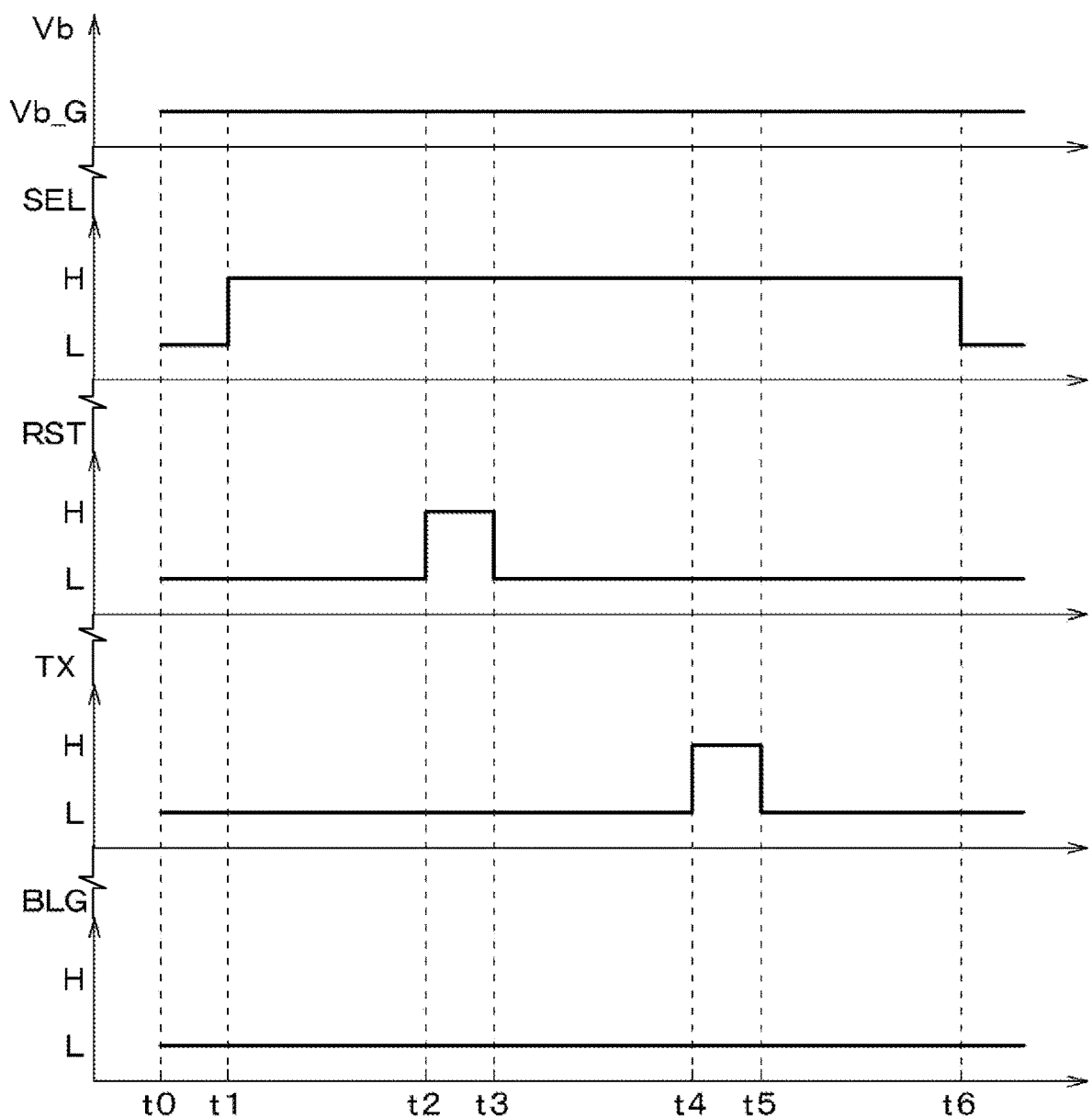
FIG. 5 shows time charts illustrating processing of generating a luminance image by the solid-state imaging element.

The APS drive circuit 26 sets the voltage levels of SEL, RST, TX, and BLG to low levels. As a result, the select transistor 420, the reset transistor 440, the transfer transistor 410, and the BL transistor 430 are turned off. Therefore, the select transistor 420 does not apply a voltage from the amplifier transistor 50 to the bit line 425. The reset transistor 440 does not apply a voltage to the floating diffusion layer 415. The transfer transistor 410 does not transfer a charge, corresponding to the photocurrent flowing from the photodiode 400, to the floating diffusion layer 415 to be described later. The bit line 425 is not connected to the BL ground 435. In FIG. 5, the low level is indicated by L. The high level is indicated by H.

In the period from time t0 to time t1, the states of the system of the vehicle, the control unit 85, and the solid-state imaging element 20 are the same as those at the time t0. Therefore, the system of the vehicle, the control unit 85, the APS drive circuit 26, and the DVS drive circuit 28 perform the same processing as that at the time t0.

At the time t1, the system of the vehicle outputs a signal, indicating that it is necessary to display the luminance image toward the driver, to the control unit 85. With the signal from this system, the control unit 85 outputs a signal for generating the luminance image to the DVS drive circuit 28 and the APS drive circuit 26.

At this time, the DVS drive circuit 28 sets Vb to the ground voltage Vb_G. As a result, the switching transistor 600 is turned on because it is a P-channel MOSFET.

Therefore, a voltage from the switching power supply 605 is applied to the drain of the amplifier transistor 50 via the switching transistor 600 and the joint portion 25. As a result, the voltage of the drain of the amplifier transistor 50 is higher than the sum of the gate voltage of the amplifier transistor 50 and the threshold voltage, so that the state of the amplifier transistor 50 is saturated. Therefore, a voltage from the floating diffusion layer 415 is applied to the select transistor 420 via the amplifier transistor 50. Furthermore, the voltage of the switching power supply 605 is applied to the gate of the feedback transistor 610 via the switching transistor 600 and the joint portion 25, so that the feedback transistor 610 is turned on.

The APS drive circuit 26 sets the voltage level of SEL to the high level. Therefore, the select transistor 420 is turned on. At this time, a voltage from the switching power supply 605 is applied to the bit line 425 via the switching transistor 600, the joint portion 25, the amplifier transistor 50, and the select transistor 420. As a result, the row of the pixel 30 to be read out is selected.

The APS drive circuit 26 sets the voltage levels of RST, TX, and BLG to the low levels. As a result, the reset transistor 440, the transfer transistor 410, and the BL transistor 430 are turned off. Therefore, the reset transistor 440 does not apply a voltage to the floating diffusion layer 415. The transfer transistor 410 does not transfer a charge, corresponding to the photocurrent flowing from the photodiode 400, to the floating diffusion layer 415 to be described later. The bit line 425 is not connected to the BL ground 435.

In the period from the time t1 to time t2, the states of the system of the vehicle, the control unit 85, and the solid-state imaging element 20 are the same as those at the time t1. Therefore, the system of the vehicle, the control unit 85, the APS drive circuit 26, and the DVS drive circuit 28 perform the same processing as that at the time t1.

At the time t2, the system of the vehicle outputs a signal, indicating that it is necessary to display the luminance image toward the driver, to the control unit 85. With the signal from this system, the control unit 85 outputs a signal for generating the luminance image to the DVS drive circuit 28 and the APS drive circuit 26.

At this time, the DVS drive circuit 28 sets Vb to the ground voltage Vb_G. As a result, the switching transistor 600 is turned on because it is a P-channel MOSFET. Therefore, a voltage from the switching power supply 605 is applied to the drain of the amplifier transistor 50 via the switching transistor 600 and the joint portion 25. As a result, the voltage of the drain of the amplifier transistor 50 becomes higher than the sum of the gate voltage of the amplifier transistor 50 and the threshold voltage, so that the state of the amplifier transistor 50 is saturated. Therefore, a voltage from the floating diffusion layer 415 is applied to the select transistor 420 via the amplifier transistor 50. Furthermore, the voltage of the switching power supply 605 is applied to the gate of the feedback transistor 610 via the switching transistor 600 and the joint portion 25, so that the feedback transistor 610 is turned on.

The APS drive circuit 26 sets the voltage level of SEL to the high level. Therefore, the select transistor 420 is turned on. At this time, a voltage from the switching power supply 605 is applied to the bit line 425 via the switching transistor 600, the joint portion 25, the amplifier transistor 50, and the select transistor 420. As a result, the row of the pixel 30 to be read out is selected.

The APS drive circuit 26 sets the voltage level of RST to the high level. Therefore, the reset transistor 440 is turned on. As a result, a voltage from the FB power supply 615 is applied to the floating diffusion layer 415 via the feedback transistor 610 and the reset transistor 440, so that the voltage of the floating diffusion layer 415 becomes a voltage corresponding to the voltage from the FB power supply 615. Therefore, the state of the floating diffusion layer 415 is initialized.

In addition, the APS drive circuit 26 sets the voltage levels of TX and BLG to the low levels. As a result, the transfer transistor 410 and the BL transistor 430 are turned off. Therefore, the transfer transistor 410 does not transfer a charge, corresponding to the photocurrent flowing from the photodiode 400, to the floating diffusion layer 415 to be described later. The bit line 425 is not connected to the BL ground 435.

In the period from the time t2 to time t3, the state of the solid-state imaging element 20 is the same as that at the time t2. Therefore, the system of the vehicle, the control unit 85, the APS drive circuit 26, and the DVS drive circuit 28 perform the same processing as that at the time t2.

At the time t3, the system of the vehicle outputs a signal, indicating that it is necessary to display the luminance image toward the driver, to the control unit 85. With the signal from this system, the control unit 85 outputs a signal for generating the luminance image to the DVS drive circuit 28 and the APS drive circuit 26.

At this time, the DVS drive circuit 28 sets Vb to the ground voltage Vb_G. As a result, the switching transistor 600 is turned on because it is a P-channel MOSFET. Therefore, a voltage from the switching power supply 605 is applied to the drain of the amplifier transistor 50 via the switching transistor 600 and the joint portion 25. As a result, the voltage of the drain of the amplifier transistor 50 is higher than the sum of the gate voltage of the amplifier transistor 50 and the threshold voltage, so that the state of the amplifier transistor 50 is saturated. Therefore, a voltage from the floating diffusion layer 415 is applied to the select transistor 420 via the amplifier transistor 50. Furthermore, the voltage of the switching power supply 605 is applied to the gate of the feedback transistor 610 via the switching transistor 600 and the joint portion 25, so that the feedback transistor 610 is turned on.

The APS drive circuit 26 sets the voltage level of SEL to the high level. Therefore, the select transistor 420 is turned on. At this time, a voltage from the switching power supply 605 is applied to the bit line 425 via the switching transistor 600, the joint portion 25, the amplifier transistor 50, and the select transistor 420. As a result, the row of the pixel 30 to be read out is selected.

Furthermore, the APS drive circuit 26 sets the voltage level of RST to the low level. Therefore, the reset transistor 440 is turned off. As a result, the voltage to be applied from the FB power supply 615 to the floating diffusion layer 415 via the feedback transistor 610 and the reset transistor 440 is stopped.

In addition, the APS drive circuit 26 sets the voltage levels of TX and BLG to the low levels. As a result, the transfer transistor 410 and the BL transistor 430 are turned off. Therefore, the transfer transistor 410 does not transfer a charge, corresponding to the photocurrent flowing from the photodiode 400, to the floating diffusion layer 415 to be described later. The bit line 425 is not connected to the BL ground 435.

In the period from the time t3 to time t4, the system of the vehicle outputs a signal, indicating that it is necessary to display the luminance image toward the driver, to the control unit 85. With the signal from this system, the control unit 85 outputs a signal for generating the luminance image to the DVS drive circuit 28 and the APS drive circuit 26.

At this time, the DVS drive circuit 28 sets Vb to the ground voltage Vb_G. As a result, the switching transistor 600 is turned on because it is a P-channel MOSFET. Therefore, a voltage from the switching power supply 605 is applied to the drain of the amplifier transistor 50 via the switching transistor 600 and the joint portion 25. As a result, the voltage of the drain of the amplifier transistor 50 is higher than the sum of the gate voltage of the amplifier transistor 50 and the threshold voltage, so that the state of the amplifier transistor 50 is saturated. Therefore, a voltage from the floating diffusion layer 415 is applied to the select transistor 420 via the amplifier transistor 50. Furthermore, the voltage of the switching power supply 605 is applied to the gate of the feedback transistor 610 via the switching transistor 600 and the joint portion 25, so that the feedback transistor 610 is turned on.

The APS drive circuit 26 sets the voltage level of SEL to the high level. Therefore, the select transistor 420 is turned on. At this time, a voltage from the switching power supply 605 is applied to the bit line 425 via the switching transistor 600, the joint portion 25, the amplifier transistor 50, and the select transistor 420. As a result, the row of the pixel 30 to be read out is selected.

Furthermore, the APS drive circuit 26 sets the voltage level of RST to the low level. Therefore, the reset transistor 440 is turned off. As a result, the voltage to be applied from the FB power supply 615 to the floating diffusion layer 415 via the feedback transistor 610 and the reset transistor 440 is stopped. At this time, the voltage of the floating diffusion layer 415 is stable as an initial state. Therefore, the image processing unit 75 reads the voltage applied from the floating diffusion layer 415 to the image processing unit 75 via the amplifier transistor 50, the select transistor 420, and the bit line 425.

In addition, the APS drive circuit 26 sets the voltage levels of TX and BLG to the low levels. As a result, the transfer transistor 410 and the BL transistor 430 are turned off. Therefore, the transfer transistor 410 does not transfer a charge, corresponding to the photocurrent flowing from the photodiode 400, to the floating diffusion layer 415 to be described later. The bit line 425 is not connected to the BL ground 435.

At the time t4, the vehicle system outputs a signal, indicating that it is necessary to display the luminance image toward the driver, to the control unit 85. With the signal from this system, the control unit 85 outputs a signal for generating the luminance image to the DVS drive circuit 28 and the APS drive circuit 26.

At this time, the DVS drive circuit 28 sets Vb to the ground voltage Vb_G. As a result, the switching transistor 600 is turned on because it is a P-channel MOSFET. Therefore, a voltage from the switching power supply 605 is applied to the drain of the amplifier transistor 50 via the switching transistor 600 and the joint portion 25. As a result, the voltage of the drain of the amplifier transistor 50 is higher than the sum of the gate voltage of the amplifier transistor 50 and the threshold voltage, so that the state of the amplifier transistor 50 is saturated. Therefore, a voltage from the floating diffusion layer 415 is applied to the select transistor 420 via the amplifier transistor 50. Furthermore, the voltage of the switching power supply 605 is applied to the gate of the feedback transistor 610 via the switching transistor 600 and the joint portion 25, so that the feedback transistor 610 is turned on.

The APS drive circuit 26 sets the voltage level of SEL to the high level. Therefore, the select transistor 420 is turned on. At this time, a voltage from the switching power supply 605 is applied to the bit line 425 via the switching transistor 600, the joint portion 25, the amplifier transistor 50, and the select transistor 420. As a result, the row of the pixel 30 to be read out is selected.

Furthermore, the APS drive circuit 26 sets the voltage level of RST to the low level. Therefore, the reset transistor 440 is turned off. As a result, the voltage to be applied from the FB power supply 615 to the floating diffusion layer 415 via the feedback transistor 610 and the reset transistor 440 is stopped.

In addition, the APS drive circuit 26 sets the voltage level of TX to the high level. Therefore, the transfer transistor 410 is turned on. At this time, the transfer transistor 410 transfers a charge, corresponding to the photocurrent flowing from the photodiode 400, to the floating diffusion layer 415. As a result, the voltage of the floating diffusion layer 415 changes.

Furthermore, the APS drive circuit 26 sets the voltage level of BLG to the low level. As a result, the BL transistor 430 is turned off. Therefore, the bit line 425 is not connected to the BL ground 435.

In the period from the time t4 to time t5, the states of the system of the vehicle, the control unit 85, and the solid-state imaging element 20 are the same as those at the time t4. Therefore, the system of the vehicle, the control unit 85, the APS drive circuit 26, and the DVS drive circuit 28 perform the same processing as that at the time t4.

At the time t5, the system of the vehicle outputs a signal, indicating that it is necessary to display the luminance image toward the driver, to the control unit 85. With the signal from this system, the control unit 85 outputs a signal for generating the luminance image to the DVS drive circuit 28 and the APS drive circuit 26.

At this time, the DVS drive circuit 28 sets Vb to the ground voltage Vb_G. As a result, the switching transistor 600 is turned on because it is a P-channel MOSFET. Therefore, a voltage from the switching power supply 605 is applied to the drain of the amplifier transistor 50 via the switching transistor 600 and the joint portion 25. As a result, the voltage of the drain of the amplifier transistor 50 is higher than the sum of the gate voltage of the amplifier transistor 50 and the threshold voltage, so that the state of the amplifier transistor 50 is saturated. Therefore, a voltage from the floating diffusion layer 415 is applied to the select transistor 420 via the amplifier transistor 50. Furthermore, the voltage of the switching power supply 605 is applied to the gate of the feedback transistor 610 via the switching transistor 600 and the joint portion 25, so that the feedback transistor 610 is turned on.

The APS drive circuit 26 sets the voltage level of SEL to the high level. Therefore, the select transistor 420 is turned on. At this time, a voltage from the switching power supply 605 is applied to the bit line 425 via the switching transistor 600, the joint portion 25, the amplifier transistor 50, and the select transistor 420. As a result, the row of the pixel 30 to be read out is selected.

Furthermore, the APS drive circuit 26 sets the voltage level of RST to the low level. Therefore, the reset transistor 440 is turned off. As a result, the voltage to be applied from the FB power supply 615 to the floating diffusion layer 415 via the feedback transistor 610 and the reset transistor 440 is stopped.

In addition, the APS drive circuit 26 sets the voltage level of TX to the low level. Therefore, the transfer transistor 410 is turned off. At this time, the transfer of a charge, corresponding to the photocurrent flowing from the photodiode 400, from the transfer transistor 410 to the floating diffusion layer 415 is stopped. As a result, the change in the voltage of the floating diffusion layer 415 is stopped.

Furthermore, the APS drive circuit 26 sets the voltage level of BLG to the low level. As a result, the BL transistor 430 is turned off. Therefore, the bit line 425 is not connected to the BL ground 435.

In the period from the time t5 to time t6, the system of the vehicle outputs a signal, indicating that it is necessary to display the luminance image toward the driver, to the control unit 85. With the signal from this system, the control unit 85 outputs a signal for generating the luminance image to the DVS drive circuit 28 and the APS drive circuit 26.

At this time, the DVS drive circuit 28 sets Vb to the ground voltage Vb_G. As a result, the switching transistor 600 is turned on because it is a P-channel MOSFET. Therefore, a voltage from the switching power supply 605 is applied to the drain of the amplifier transistor 50 via the switching transistor 600 and the joint portion 25. As a result, the voltage of the drain of the amplifier transistor 50 is higher than the sum of the gate voltage of the amplifier transistor 50 and the threshold voltage, so that the state of the amplifier transistor 50 is saturated. Therefore, a voltage from the floating diffusion layer 415 is applied to the select transistor 420 via the amplifier transistor 50. Furthermore, the voltage of the switching power supply 605 is applied to the gate of the feedback transistor 610 via the switching transistor 600 and the joint portion 25, so that the feedback transistor 610 is turned on.

The APS drive circuit 26 sets the voltage level of SEL to the high level. Therefore, the select transistor 420 is turned on. At this time, a voltage from the switching power supply 605 is applied to the bit line 425 via the switching transistor 600, the joint portion 25, the amplifier transistor 50, and the select transistor 420. As a result, the row of the pixel 30 to be read out is selected.

Furthermore, the APS drive circuit 26 sets the voltage level of RST to the low level. Therefore, the reset transistor 440 is turned off. As a result, the voltage to be applied from the FB power supply 615 to the floating diffusion layer 415 via the feedback transistor 610 and the reset transistor 440 is stopped.

In addition, the APS drive circuit 26 sets the voltage level of TX to the low level. Therefore, the transfer transistor 410 is turned off. At this time, the transfer of a charge, corresponding to the photocurrent flowing from the photodiode 400, from the transfer transistor 410 to the floating diffusion layer 415 is stopped. As a result, the change in the voltage of the floating diffusion layer 415 is stopped. At this time, the voltage of the floating diffusion layer 415 after the change due to the transfer from the transfer transistor 410 is stable. Therefore, the image processing unit 75 reads the voltage applied from the floating diffusion layer 415 to the image processing unit 75 via the amplifier transistor 50, the select transistor 420, and the bit line 425. In addition, the image processing unit 75 calculates a change in the voltage of the floating diffusion layer 415 by subtracting the voltage of the floating diffusion layer 415, occurring when initialized, from the read voltage. Furthermore, the image processing unit 75 generates the luminance image by performing processing, such as AD conversion, CDS processing, and dark current correction, on the calculated change in the voltage. Furthermore, the image processing unit 75 stores the generated luminance image in the storage unit 80. Note that the voltage of the initialized floating diffusion layer 415 corresponds to the voltage of the floating diffusion layer 415 read in the period from the time t3 to the time t4.

Furthermore, the APS drive circuit 26 sets the voltage level of BLG to the low level. As a result, the BL transistor 430 is turned off. Therefore, the bit line 425 is not connected to the BL ground 435.

At the time t6, the system of the vehicle outputs a signal, indicating that it is necessary to display the luminance image toward the driver, to the control unit 85. With the signal from this system, the control unit 85 outputs a signal for generating the luminance image to the DVS drive circuit 28 and the APS drive circuit 26.

At this time, the DVS drive circuit 28 sets Vb to the ground voltage Vb_G. As a result, the switching transistor 600 is turned on because it is a P-channel MOSFET. Therefore, a voltage from the switching power supply 605 is applied to the drain of the amplifier transistor 50 via the switching transistor 600 and the joint portion 25. As a result, the voltage of the drain of the amplifier transistor 50 is higher than the sum of the gate voltage of the amplifier transistor 50 and the threshold voltage, so that the state of the amplifier transistor 50 is saturated. Therefore, a voltage from the floating diffusion layer 415 is applied to the select transistor 420 via the amplifier transistor 50. Furthermore, the voltage of the switching power supply 605 is applied to the gate of the feedback transistor 610 via the switching transistor 600 and the joint portion 25, so that the feedback transistor 610 is turned on.

In addition, the APS drive circuit 26 sets the voltage level of SEL to the low level. Therefore, the select transistor 420 is turned off. At this time, the voltage to be applied from the switching power supply 605 to the bit line 425 via the switching transistor 600, the joint portion 25, the amplifier transistor 50, and the select transistor 420 is stopped. As a result, the selection of the row of the pixel 30 to be read out is stopped.

The APS drive circuit 26 sets the voltage levels of RST, TX, and BLG to the low levels. As a result, the reset transistor 440, the transfer transistor 410, and the BL transistor 430 are turned off. Therefore, the reset transistor 440 does not apply a voltage to the floating diffusion layer 415. The transfer transistor 410 does not transfer a charge, corresponding to the photocurrent flowing from the photodiode 400, to the floating diffusion layer 415 to be described later. The bit line 425 is not connected to the BL ground 435. Therefore, the state of the solid-state imaging element 20 returns to the state at the time t0, and the processing in the row ends.

By repeating the above sequence multiple times, the solid-state imaging element 20 generates the luminance image as a frame. Next, detection of the event by the solid-state imaging element 20 will be described.

It is assumed that the vehicle on which the imaging apparatus 10 is mounted is operated, for example, in a state in which a driving assistance system that performs PCS control and the like is operating. At this time, the system of the vehicle outputs a signal, indicating that the driving assistance system is operating, to the control unit 85. With the signal of this system, the control unit 85 outputs a signal for generating the event to the DVS drive circuit 28 and the APS drive circuit 26. Note that PCS is an abbreviation for Pre Crash Safety Control.

At this time, the DVS drive circuit 28 sets Vb of each pixel 30 to a predetermined voltage Vb_P. As a result, the switching transistor 600 is turned on. Note that the predetermined voltage Vb_P is higher than the ground voltage Vb_G and lower than the voltage of the switching power supply 605.

The APS drive circuit 26 sets the voltage level of RST of each pixel 30 to the high level. As a result, the reset transistor 440 is turned on. As a result, a voltage from the FB power supply 615 is applied to the floating diffusion layer 415 via the feedback transistor 610 and the reset transistor 440, so that the voltage of the floating diffusion layer 415 becomes a voltage corresponding to the voltage of the FB power supply 615. The voltage of the floating diffusion layer 415 is applied to the gate of the amplifier transistor 50, so that the amplifier transistor 50 is turned on. Note that the voltage corresponding to the voltage of the FB power supply 615 is higher than the voltage of the PD ground 405 and lower than the voltage of the FB power supply 615.

Furthermore, the APS drive circuit 26 sets the voltage level of TX of each pixel 30 to the high level. Therefore, the transfer transistor 410 is turned on. At this time, the transfer transistor 410 transfers a charge, corresponding to the photocurrent flowing from the photodiode 400, to the floating diffusion layer 415. As a result, the voltage of the floating diffusion layer 415 changes from the voltage corresponding to the voltage of the FB power supply 615.

In addition, the APS drive circuit 26 sets the voltage levels of SEL and BLG of each pixel 30 to the high levels. Therefore, the select transistor 420 and the BL transistor 430 are turned on. At this time, the voltage of the source of the amplifier transistor 50 becomes the voltage of the BL ground 435.

For example, when a photocurrent is generated here by the photodiode 400, a photoelectron is transferred from the transfer transistor 410 to the floating diffusion layer 415, so that the voltage of the floating diffusion layer 415 decreases. Therefore, a difference between the voltages of the drain and the gate of the amplifier transistor 50 increases, so that the voltage to be applied from the amplifier transistor 50 to the operational amplifier 620 increases. At this time, the operational amplifier 620 amplifies the input voltage and applies the amplified voltage to the first comparator 621 and the second comparator 622. Since the voltage input to the operational amplifier 620 increases, the first comparator 621 outputs a signal whose voltage is a low level to the logic circuit 625. Since the voltage input to the operational amplifier 620 increases, the second comparator 622 outputs a signal whose voltage level is a high level to the logic circuit 625. At this time, the logic circuit 625 outputs, to the signal processing unit 70, the position of the pixel 30 and +1 that is the polarity of the event, which correspond to the logic circuit 625. The signal processing unit 70 outputs, to the outside, signals about the position of the pixel 30 and the polarity of the event. Furthermore, the signal processing unit 70 generates an event frame by performing signal processing such as image recognition processing. The signal processing unit 70 outputs the generated event frame to the outside. For example, the position of the pixel 30, the polarity of the event, and the event frame that are from the signal processing unit 70 are stored in the storage unit 80.

After outputting to the signal processing unit 70, the logic circuit 625 resets the signal from the first comparator 621 and the signal from the second comparator 622. Furthermore, the logic circuit 625 outputs a signal, indicating that they have been reset, to the operational amplifier 620. At this time, the operational amplifier 620 amplifies the input voltage and applies the amplified voltage to the first comparator 621 and the second comparator 622. Therefore, the detection of the event by the operational amplifier 620, the first comparator 621, the second comparator 622, and the logic circuit 625 is repeated.

In addition, the difference between the voltages of the drain and the gate of the amplifier transistor 50 increases, so that the voltage to be applied from the amplifier transistor 50 to the gate of the feedback transistor 610 increases. Therefore, a driving force for the feedback transistor 610 increases, so that a current easily flows from the feedback transistor 610 to the floating diffusion layer 415 via the reset transistor 440. Therefore, at this time, the voltage of the floating diffusion layer 415 is increased by a voltage from the feedback transistor 610. Therefore, the voltage of the floating diffusion layer 415 nears the voltage before the photocurrent is generated by the photodiode 400, so that the state of the floating diffusion layer 415 easily returns to the state before the photocurrent is generated by the photodiode 400. Therefore, the voltage responsiveness of the floating diffusion layer 415 is improved, so that the responsiveness of the signal output from the logic circuit 625 is improved.

As described above, the solid-state imaging element 20 detects the event. Next, reduction in the number of transistors by the solid-state imaging element 20 will be described.

The solid-state imaging element 20 includes the pixel 30 and the image processing unit 75. The pixel 30 includes the photodiode 400, the floating diffusion layer 415, the switching power supply 605, the switching transistor 600, the DVS drive circuit 28, the amplifier transistor 50, the first comparator 621, and the second comparator 622. The photodiode 400 generates, by photoelectric conversion, a photocurrent corresponding to an amount of light. The floating diffusion layer 415 accumulates a charge corresponding to the photocurrent and outputs a voltage corresponding to the amount of the charges accumulated. The switching transistor 600 is connected to the switching power supply 605. The DVS drive circuit 28 turns on the switching transistor 600 by applying a voltage to the switching transistor 600. When Vb is the ground voltage Vb_G, the voltage of the drain of the amplifier transistor 50 is maintained at a predetermined voltage by applying a voltage from the switching power supply 605. And, the amplifier transistor 50 outputs, from its source, a voltage corresponding to the change in the voltage of the floating diffusion layer 415. When Vb is the predetermined voltage Vb_P higher than the ground voltage Vb_G, the amplifier transistor 50 outputs, from its drain, a voltage corresponding to the change in the voltage of the floating diffusion layer 415. The first comparator 621 detects whether the voltage from the drain of the amplifier transistor 50 has decreased. The second comparator 622 detects whether the voltage from the drain of the amplifier transistor 50 has increased. When Vb is the ground voltage Vb_G, the image processing unit 75 generates the luminance image on the basis of a change in the voltage output from the source of the amplifier transistor 50. Note that the photodiode 400 corresponds to a photoelectric conversion element. The floating diffusion layer 415 corresponds to a charge accumulation unit. The amplifier transistor 50 corresponds to a common transistor. The drain of the amplifier transistor 50 corresponds to one end or a first terminal of the common transistor. The source of the amplifier transistor 50 corresponds to the other end or a second terminal of the common transistor. Vb corresponds to the voltage to be applied from the DVS drive circuit 28 to the switching transistor 600 and corresponds to an element voltage. The predetermined voltage corresponds to a voltage higher than the sum of the gate voltage of the amplifier transistor 50 and the threshold voltage.

As a result, when the luminance image is generated, the amplifier transistor 50 outputs, from its source, a voltage corresponding to the change in the voltage of the floating diffusion layer 415. When an event indicating a temporal change in the amount of light in the pixel 30 is detected, the amplifier transistor 50 outputs, from its drain, a voltage corresponding to the change in the voltage of the floating diffusion layer 415. Therefore, it is not necessary to include a transistor for generating a luminance image and a transistor for detecting the event. Therefore, the number of transistors can be reduced.

In the first embodiment, the following effects are also exerted.

The pixel 30 further includes the FB power supply 615, the reset transistor 440, and the APS drive circuit 26. The reset transistor 440 is connected to the FB power supply 615. The APS drive circuit 26 turns on the reset transistor 440 by applying a voltage to the reset transistor 440. When Vb is the predetermined voltage Vb_P higher than the ground voltage Vb_G, the reset transistor 440 sets the voltage of the floating diffusion layer 415 to a voltage corresponding to the voltage of the FB power supply 615. After the voltage of the floating diffusion layer 415 becomes the voltage corresponding to the voltage of the FB power supply 615 by the reset transistor 440, the amplifier transistor 50 outputs, from its drain, a voltage corresponding to the change in the voltage of the floating diffusion layer 415. Note that the switching power supply 605 corresponds to a first power supply. The DVS drive circuit 28 corresponds to a first drive circuit. The switching transistor 600 corresponds to a first transistor. The FB power supply 615 corresponds to a second power supply. The APS drive circuit 26 corresponds to a second drive circuit. The reset transistor 440 corresponds to a second transistor.

As a result, the amplifier transistor 50 outputs, from its drain, a voltage corresponding to a variation from the voltage corresponding to the voltage of the FB power supply 615. Therefore, the voltage, corresponding to the change in the voltage of the floating diffusion layer 415, is easily calculated, so that an increase or decrease in the voltage from the drain of the amplifier transistor 50 is easily detected by the first comparator 621 and the second comparator 622. Therefore, the event is easily detected.

The pixel 30 further includes the bit line 425, the BL transistor 430, and the BL ground 435. When Vb is the ground voltage Vb_G, the bit line 425 outputs a voltage from the source of the amplifier transistor 50 to the image processing unit 75. When turned on by a voltage from the APS drive circuit 26, the BL transistor 430 connects the bit line 425 and the BL ground 435. When Vb is the predetermined voltage Vb_P higher than the ground voltage Vb_G, the BL ground 435 is connected to the bit line 425, so that the voltage of the source of the amplifier transistor 50 is made the voltage of the BL ground 435.

As a result, when the event is detected, an increase in the potential of a well of the pixel 30, due to the flow of a current through the well of the pixel 30, is suppressed. Therefore, a change in the characteristics of the photodiode 400, due to an increase in the potential of the well, is suppressed, so that deterioration in the image quality of the solid-state imaging element 20 is suppressed.

Second Embodiment

A second embodiment is different from the first embodiment in the form of an APS circuit 40. Others are the same as those of the first embodiment.

Figure 6:
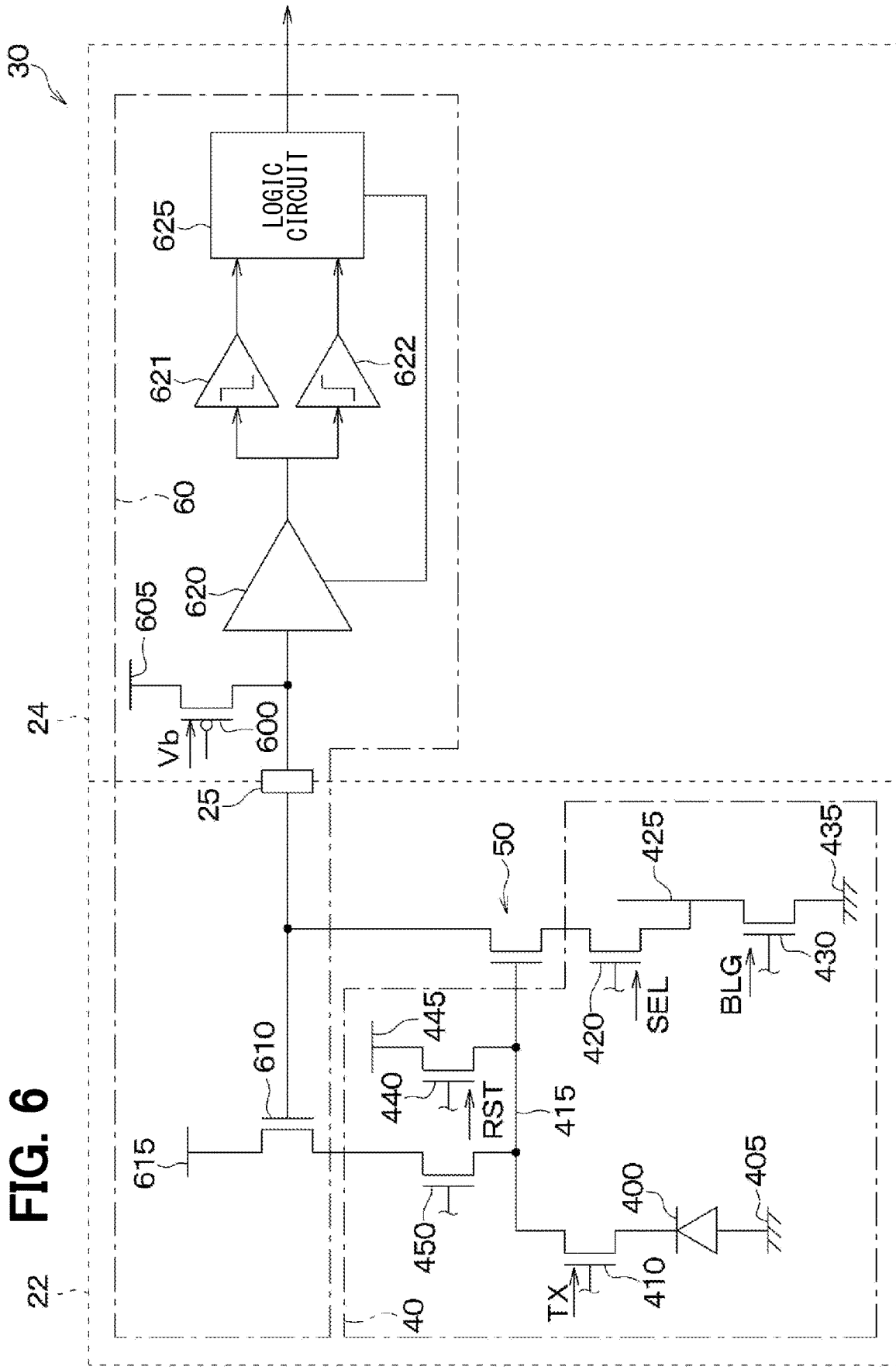
FIG. 6 illustrates a structural view of a pixel of a solid-state imaging element according to a second embodiment.

As illustrated in FIG. 6, the APS circuit 40 further includes a reset power supply 445 and a mode transistor 450. The reset power supply 445 is connected to the drain of the reset transistor 440. The source of the reset transistor 440 is connected to the floating diffusion layer 415. When turned on, the reset transistor 440 applies a voltage from the reset power supply 445 to the floating diffusion layer 415, thereby making the voltage of the floating diffusion layer 415 a voltage corresponding to the voltage of the reset power supply 445. As a result, the reset transistor 440 initializes the state of the floating diffusion layer 415. When turned off, the reset transistor 440 does not apply a voltage from the reset power supply 445 to the floating diffusion layer 415.

The mode transistor 450 is an N-channel MOSFET. The drain of the mode transistor 450 is connected to the source of the feedback transistor 610. The source of the mode transistor 450 is connected between the transfer transistor 410 and the floating diffusion layer 415. The gate of the mode transistor 450 is connected to the APS drive circuit 26. Therefore, a voltage from the APS drive circuit 26 is applied to the gate of the reset transistor 440, so that the mode transistor 450 is turned on or off.

The second embodiment is configured as described above. Next, generation of the luminance image by the solid-state imaging element 20 will be described.

It is assumed that it is necessary to display the luminance image toward a driver since the vehicle on which the imaging apparatus 10 is mounted is operated by the driver. At this time, the system of the vehicle outputs, to the control unit 85, a signal indicating that it is necessary to display the luminance image toward the driver. With the signal from this system, the control unit 85 outputs a signal for generating the luminance image to the DVS drive circuit 28 and the APS drive circuit 26.

At this time, the APS drive circuit 26 sets the voltage level of the gate voltage of the mode transistor 450 to a low level. As a result, the mode transistor 450 is turned off. Then, the system of the vehicle, the control unit 85, the APS drive circuit 26, and the DVS drive circuit 28 perform the same processing as that at the times t0 to t6.

As described above, the solid-state imaging element 20 generates the luminance image. Next, detection of the event by the solid-state imaging element 20 will be described.

It is assumed that the vehicle on which the imaging apparatus 10 is mounted is operated, for example, in a state in which a driving assistance system that performs PCS control and the like is operating. At this time, the system of the vehicle outputs a signal, indicating that the driving assistance system is operating, to the control unit 85. With the signal of this system, the control unit 85 outputs a signal for generating the event to the DVS drive circuit 28 and the APS drive circuit 26.

At this time, the APS drive circuit 26 sets the voltage level of the gate voltage of the mode transistor 450 to a high level. As a result, the mode transistor 450 is turned on. Thereafter, the solid-state imaging element 20 detects the event by performing the same processing as that of the first embodiment.

As described above, the solid-state imaging element 20 detects the event. Also, in the second embodiment, the same effects as those of the first embodiment are exerted. In the second embodiment, the following effects are also exerted.

Here, in the first embodiment, a voltage from the FB power supply 615 is applied to the floating diffusion layer 415 via the feedback transistor 610 and the reset transistor 440, thereby initializing the state of the floating diffusion layer 415. In the second embodiment, however, the reset transistor 440 is connected to the reset power supply 445 and the floating diffusion layer 415. Therefore, a voltage from the reset power supply 445 is applied to the floating diffusion layer 415 via the reset transistor 440, thereby initializing the state of the floating diffusion layer 415. Note that the reset power supply 445 corresponds to the second power supply.

As a result, a voltage change corresponding to the voltage drop by the feedback transistor 610 can be read out, so that the dynamic range of the pixel 30 is more expanded than that in the first embodiment.

Third Embodiment

A third embodiment is different from the first embodiment in the form of a pixel 30. Others are the same as those of the first embodiment.

Figure 7:
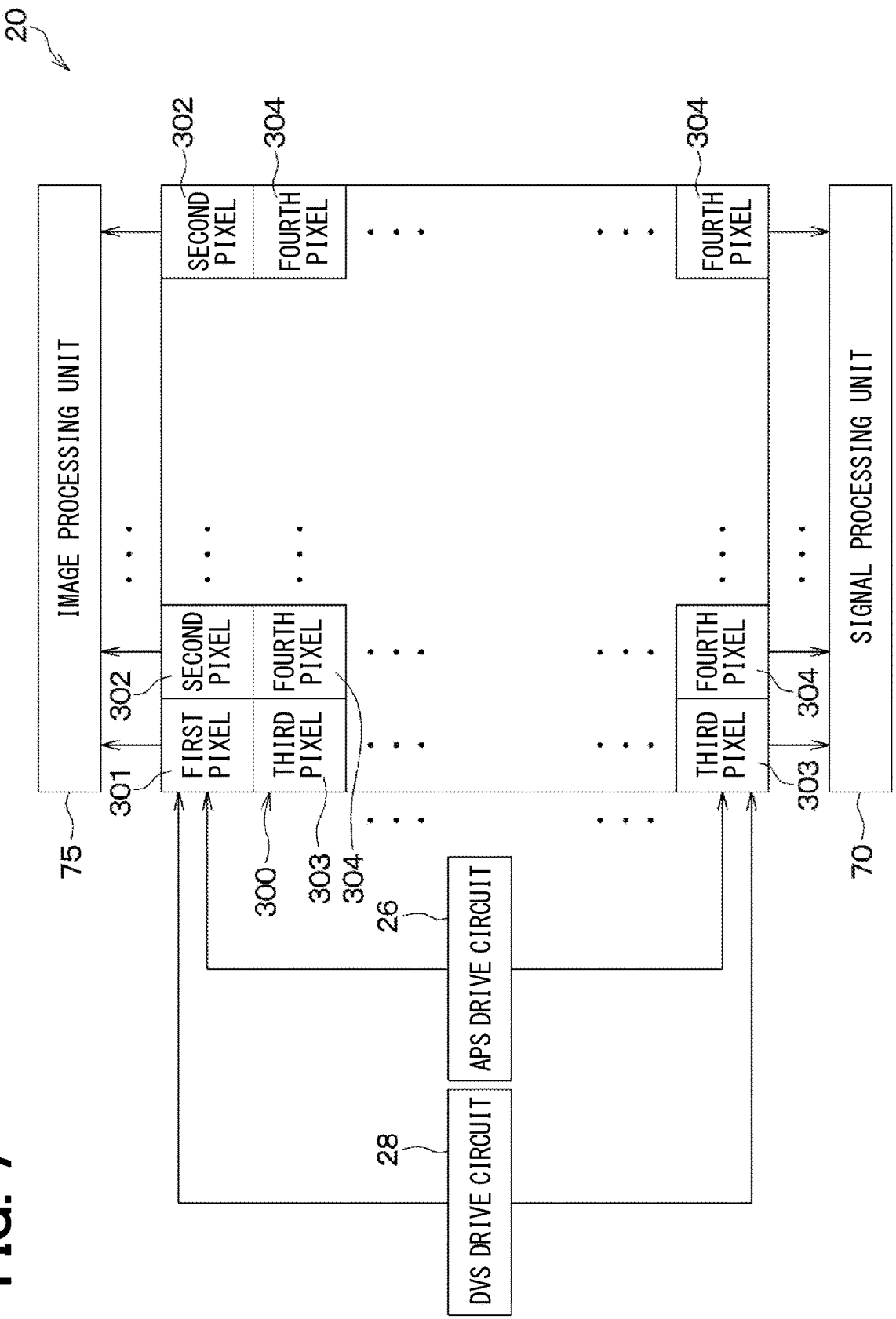
FIG. 7 illustrates a structural view of a solid-state imaging element according to a third embodiment.
Figure 8:
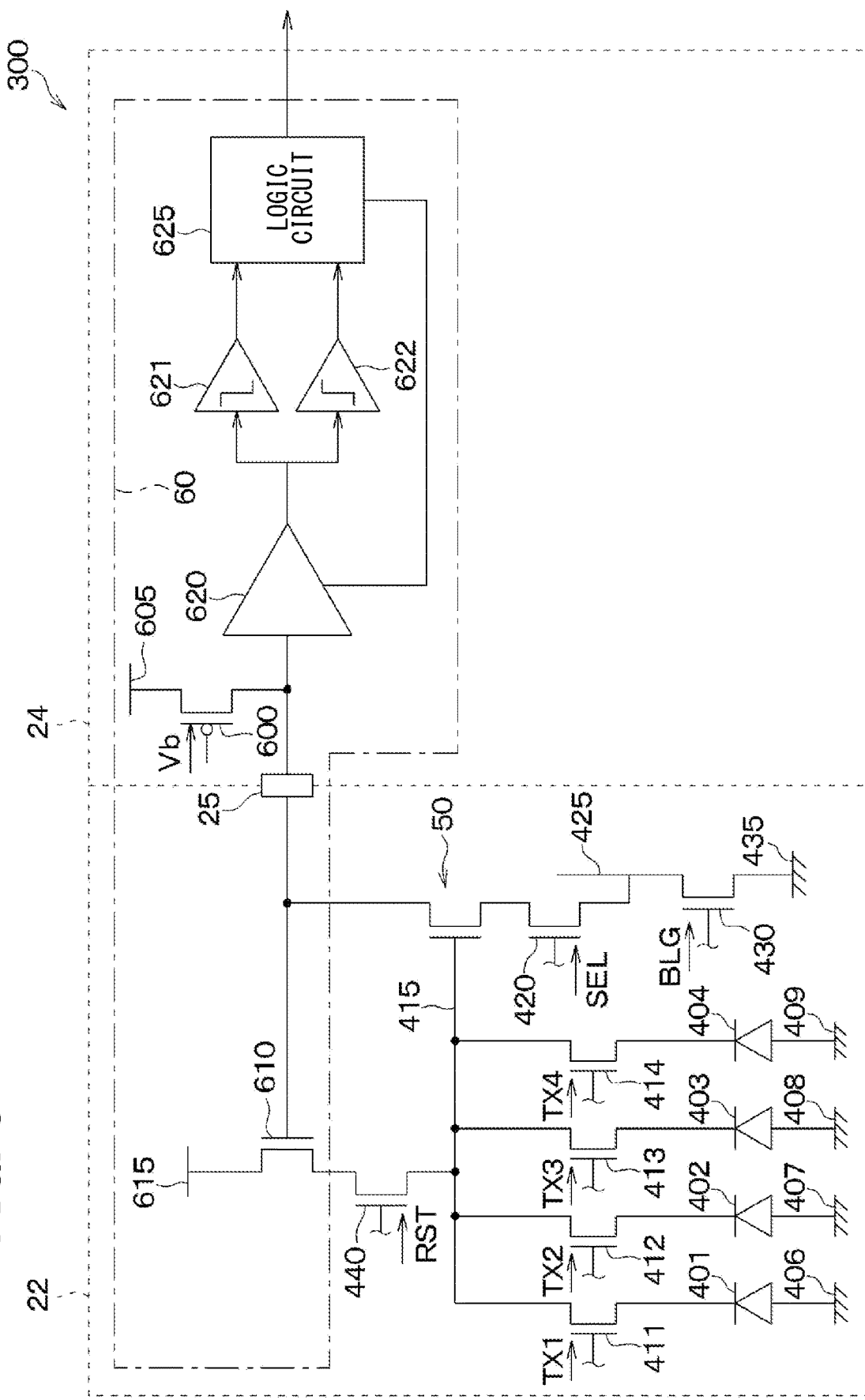
FIG. 8 illustrates a structural view of a pixel block of the solid-state imaging element.

Here, the solid-state imaging element 20 includes multiple pixel blocks 300, as illustrated in FIG. 7. The pixel block 300 includes a first pixel 301, a second pixel 302, a third pixel 303, and a fourth pixel 304. As illustrated in FIG. 8, the first pixel 301, the second pixel 302, the third pixel 303, and the fourth pixel 304 share the floating diffusion layer 415, the select transistor 420, and the bit line 425. In addition, the first pixel 301, the second pixel 302, the third pixel 303, and the fourth pixel 304 share the BL transistor 430, the BL ground 435, and the reset transistor 440. Furthermore, the first pixel 301, the second pixel 302, the third pixel 303, and the fourth pixel 304 share the DVS circuit 60. In addition, the first pixel 301, the second pixel 302, the third pixel 303, and the fourth pixel 304 are arranged, for example, in a Bayer array. Note that the arrangement of the pixels 30 in the pixel block 300 is not limited to the Bayer array, and any arrangement may be adopted.

The first pixel 301 includes a first photodiode 401, a PD first ground 406, and a first transfer transistor 411. The second pixel 302 includes a second photodiode 402, a PD second ground 407, and a second transfer transistor 412. The third pixel 303 includes a third photodiode 403, a PD third ground 408, and a third transfer transistor 413. The fourth pixel 304 includes a fourth photodiode 404, a PD fourth ground 409, and a fourth transfer transistor 414.

The anode of the first photodiode 401 is connected to the PD first ground 406. The first photodiode 401 generates, by photoelectric conversion, a photocurrent corresponding to the amount of the red light guided from the lens 15. Furthermore, the first photodiode 401 allows the generated photocurrent to flow to the first transfer transistor 411 to be described later.

The first transfer transistor 411 is an N-channel MOSFET. The source of the first transfer transistor 411 is connected to the cathode of the first photodiode 401. The gate of the first transfer transistor 411 is connected to the APS drive circuit 26. Therefore, a voltage from the APS drive circuit 26 is applied to the gate of the first transfer transistor 411, so that the first transfer transistor 411 is turned on or off. When turned on, the first transfer transistor 411 transfers a charge, corresponding to the photocurrent flowing from the first photodiode 401, to the floating diffusion layer 415 to be described later. When turned off, the first transfer transistor 411 does not transfer a charge, corresponding to the photocurrent flowing from the first photodiode 401, to the floating diffusion layer 415 to be described later.

The anode of the second photodiode 402 is connected to the PD second ground 407. The second photodiode 402 generates, by photoelectric conversion, a photocurrent corresponding to the amount of the green light guided from the lens 15. Furthermore, the second photodiode 402 allows the generated photocurrent to flow to the second transfer transistor 412 to be described later.

The second transfer transistor 412 is an N-channel MOSFET. The source of the second transfer transistor 412 is connected to the cathode of the second photodiode 402. The gate of the second transfer transistor 412 is connected to the APS drive circuit 26. Therefore, a voltage from the APS drive circuit 26 is applied to the gate of the second transfer transistor 412, so that the second transfer transistor 412 is turned on or off. When turned on, the second transfer transistor 412 transfers a charge, corresponding to the photocurrent flowing from the second photodiode 402, to the floating diffusion layer 415 to be described later. When turned off, the second transfer transistor 412 does not transfer a charge, corresponding to the photocurrent flowing from the second photodiode 402, to the floating diffusion layer 415 to be described later.

The anode of the third photodiode 403 is connected to the PD third ground 408. The third photodiode 403 generates, by photoelectric conversion, a photocurrent corresponding to the amount of the green light guided from the lens 15. Furthermore, the third photodiode 403 allows the generated photocurrent to flow to the third transfer transistor 413 to be described later.

The third transfer transistor 413 is an N-channel MOSFET. The source of the third transfer transistor 413 is connected to the cathode of the third photodiode 403. The gate of the third transfer transistor 413 is connected to the APS drive circuit 26. Therefore, a voltage from the APS drive circuit 26 is applied to the gate of the third transfer transistor 413, so that the third transfer transistor 413 is turned on or off. When turned on, the third transfer transistor 413 transfers a charge, corresponding to the photocurrent flowing from the third photodiode 403, to the floating diffusion layer 415 to be described later. When turned off, the third transfer transistor 413 does not transfer a charge, corresponding to the photocurrent flowing from the third photodiode 403, to the floating diffusion layer 415 to be described later.

The anode of the fourth photodiode 404 is connected to the PD fourth ground 409. The fourth photodiode 404 generates, by photoelectric conversion, a photocurrent corresponding to the amount of the blue light guided from the lens 15. Furthermore, the fourth photodiode 404 allows the generated photocurrent to flow to the fourth transfer transistor 414 to be described later.

The fourth transfer transistor 414 is an N-channel MOSFET. The source of the fourth transfer transistor 414 is connected to the cathode of the fourth photodiode 404. The gate of the fourth transfer transistor 414 is connected to the APS drive circuit 26. Therefore, a voltage from the APS drive circuit 26 is applied to the gate of the fourth transfer transistor 414, so that the fourth transfer transistor 414 is turned on or off. When turned on, the fourth transfer transistor 414 transfers a charge, corresponding to the photocurrent flowing from the fourth photodiode 404, to the floating diffusion layer 415 to be described later. When turned off, the fourth transfer transistor 414 does not transfer a charge, corresponding to the photocurrent flowing from the fourth photodiode 404, to the floating diffusion layer 415 to be described later.

Figure 9:
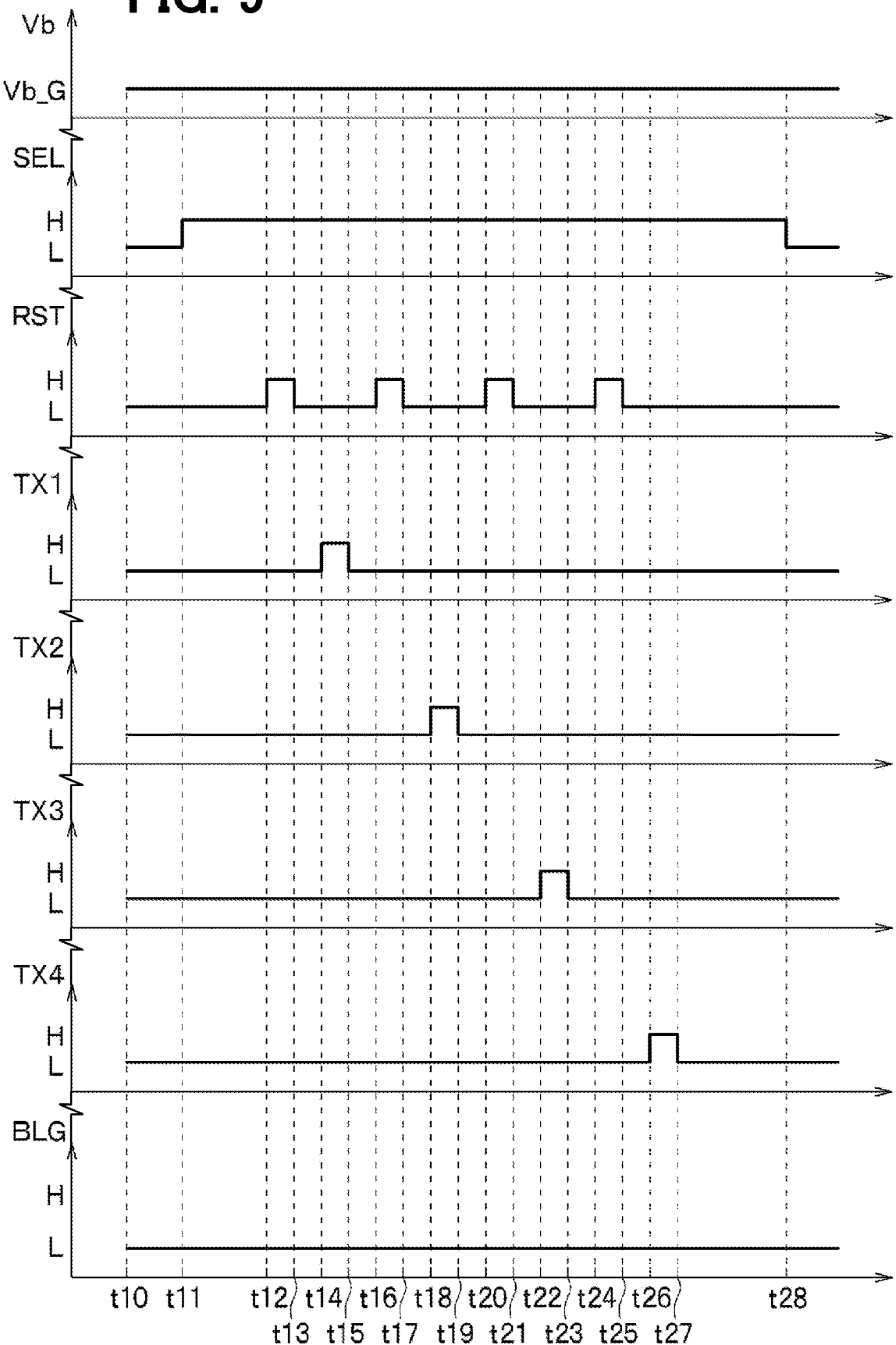
FIG. 9 shows time charts illustrating processing of generating a luminance image by the solid-state imaging element.

The third embodiment is configured as described above. Next, generation of the luminance image by the solid-state imaging element 20 will be described with reference to the time charts in FIG. 9.

Here, for this description, the following terms are defined. As illustrated in FIG. 8, the gate voltage of the first transfer transistor 411 is defined as TX1. The gate voltage of the second transfer transistor 412 is defined as TX2. The gate voltage of the third transfer transistor 413 is defined as TX3. The gate voltage of the fourth transfer transistor 414 is defined as TX4.

Returning to FIG. 9, in the period from time t10 to time t14, the system of the vehicle, the control unit 85, the APS drive circuit 26, and the DVS drive circuit 28 perform the same processing as that in the period from the time t0 to the time t4.

At the time t14, the system of the vehicle outputs a signal, indicating that it is necessary to display the luminance image toward the driver, to the control unit 85. With the signal from this system, the control unit 85 outputs a signal for generating the luminance image to the DVS drive circuit 28 and the APS drive circuit 26.

At this time, the DVS drive circuit 28 sets Vb to the ground voltage Vb_G. As a result, the switching transistor 600 is turned on because it is a P-channel MOSFET. Therefore, a voltage from the switching power supply 605 is applied to the drain of the amplifier transistor 50 via the switching transistor 600 and the joint portion 25. As a result, the voltage of the drain of the amplifier transistor 50 is higher than the sum of the gate voltage of the amplifier transistor 50 and the threshold voltage, so that the state of the amplifier transistor 50 is saturated. Therefore, a voltage from the floating diffusion layer 415 is applied to the select transistor 420 via the amplifier transistor 50. Furthermore, the voltage of the switching power supply 605 is applied to the gate of the feedback transistor 610 via the switching transistor 600 and the joint portion 25, so that the feedback transistor 610 is turned on.

The APS drive circuit 26 sets the voltage level of SEL to the high level. Therefore, the select transistor 420 is turned on. At this time, a voltage from the switching power supply 605 is applied to the bit line 425 via the switching transistor 600, the joint portion 25, the amplifier transistor 50, and the select transistor 420. As a result, the row of the pixel 30 to be read out is selected.

Furthermore, the APS drive circuit 26 sets the voltage level of RST to the low level. Therefore, the reset transistor 440 is turned off. As a result, the voltage to be applied from the FB power supply 615 to the floating diffusion layer 415 via the feedback transistor 610 and the reset transistor 440 is stopped.

In addition, the APS drive circuit 26 sets the voltage level of TX1 to the high level. Therefore, the first transfer transistor 411 is turned on. At this time, the first transfer transistor 411 transfers a charge, corresponding to the photocurrent flowing from the first photodiode 401, to the floating diffusion layer 415. As a result, the voltage of the floating diffusion layer 415 changes.

Furthermore, the APS drive circuit 26 sets the voltage level of BLG to the low level. As a result, the BL transistor 430 is turned off. Therefore, the bit line 425 is not connected to the BL ground 435.

In the period from the time t14 to time t15, the states of the system of the vehicle, the control unit 85, and the solid-state imaging element 20 are the same as those at the time t14. Therefore, the system of the vehicle, the control unit 85, the APS drive circuit 26, and the DVS drive circuit 28 perform the same processing as that at the time t14.

At the time t15, the system of the vehicle outputs a signal, indicating that it is necessary to display the luminance image toward the driver, to the control unit 85. With the signal from this system, the control unit 85 outputs a signal for generating the luminance image to the DVS drive circuit 28 and the APS drive circuit 26.

At this time, the DVS drive circuit 28 sets Vb to the ground voltage Vb_G. As a result, the switching transistor 600 is turned on because it is a P-channel MOSFET. Therefore, a voltage from the switching power supply 605 is applied to the drain of the amplifier transistor 50 via the switching transistor 600 and the joint portion 25. As a result, the voltage of the drain of the amplifier transistor 50 is higher than the sum of the gate voltage of the amplifier transistor 50 and the threshold voltage, so that the state of the amplifier transistor 50 is saturated. Therefore, a voltage from the floating diffusion layer 415 is applied to the select transistor 420 via the amplifier transistor 50. Furthermore, the voltage of the switching power supply 605 is applied to the gate of the feedback transistor 610 via the switching transistor 600 and the joint portion 25, so that the feedback transistor 610 is turned on.

The APS drive circuit 26 sets the voltage level of SEL to the high level. Therefore, the select transistor 420 is turned on. At this time, a voltage from the switching power supply 605 is applied to the bit line 425 via the switching transistor 600, the joint portion 25, the amplifier transistor 50, and the select transistor 420. As a result, the row of the pixel 30 to be read out is selected.

Furthermore, the APS drive circuit 26 sets the voltage level of RST to the low level. Therefore, the reset transistor 440 is turned off. As a result, the voltage to be applied from the FB power supply 615 to the floating diffusion layer 415 via the feedback transistor 610 and the reset transistor 440 is stopped.

In addition, the APS drive circuit 26 sets the voltage level of TX1 to the low level. Therefore, the first transfer transistor 411 is turned off. At this time, the transfer of a charge, corresponding to the photocurrent flowing from the first photodiode 401, from the first transfer transistor 411 to the floating diffusion layer 415 is stopped. As a result, the change in the voltage of the floating diffusion layer 415 is stopped.

Furthermore, the APS drive circuit 26 sets the voltage level of BLG to the low level. As a result, the BL transistor 430 is turned off. Therefore, the bit line 425 is not connected to the BL ground 435.

In the period from the time t15 to time t16, the system of the vehicle outputs a signal, indicating that it is necessary to display the luminance image toward the driver, to the control unit 85. With the signal from this system, the control unit 85 outputs a signal for generating the luminance image to the DVS drive circuit 28 and the APS drive circuit 26.

At this time, the DVS drive circuit 28 sets Vb to the ground voltage Vb_G. As a result, the switching transistor 600 is turned on because it is a P-channel MOSFET. Therefore, a voltage from the switching power supply 605 is applied to the drain of the amplifier transistor 50 via the switching transistor 600 and the joint portion 25. As a result, the voltage of the drain of the amplifier transistor 50 is higher than the sum of the gate voltage of the amplifier transistor 50 and the threshold voltage, so that the state of the amplifier transistor 50 is saturated. Therefore, a voltage from the floating diffusion layer 415 is applied to the select transistor 420 via the amplifier transistor 50. Furthermore, the voltage of the switching power supply 605 is applied to the gate of the feedback transistor 610 via the switching transistor 600 and the joint portion 25, so that the feedback transistor 610 is turned on.

The APS drive circuit 26 sets the voltage level of SEL to the high level. Therefore, the select transistor 420 is turned on. At this time, a voltage from the switching power supply 605 is applied to the bit line 425 via the switching transistor 600, the joint portion 25, the amplifier transistor 50, and the select transistor 420. As a result, the row of the pixel 30 to be read out is selected.

Furthermore, the APS drive circuit 26 sets the voltage level of RST to the low level. Therefore, the reset transistor 440 is turned off. As a result, the voltage to be applied from the FB power supply 615 to the floating diffusion layer 415 via the feedback transistor 610 and the reset transistor 440 is stopped.

In addition, the APS drive circuit 26 sets the voltage level of TX1 to the low level. Therefore, the first transfer transistor 411 is turned off. At this time, the transfer of a charge, corresponding to the photocurrent flowing from the first photodiode 401, from the first transfer transistor 411 to the floating diffusion layer 415 is stopped. As a result, the change in the voltage of the floating diffusion layer 415 is stopped. At this time, the voltage of the floating diffusion layer 415 after the change due to the transfer from the first transfer transistor 411 is stable. Therefore, the image processing unit 75 reads the voltage applied from the floating diffusion layer 415 to the image processing unit 75 via the amplifier transistor 50, the select transistor 420, and the bit line 425. In addition, the image processing unit 75 calculates a change in the voltage of the floating diffusion layer 415 by subtracting the voltage of the floating diffusion layer 415, occurring when initialized, from the read voltage. Furthermore, the image processing unit 75 generates the luminance image by performing processing, such as AD conversion, CDS processing, and dark current correction, on the calculated change in the voltage. Furthermore, the image processing unit 75 stores the generated luminance image in the storage unit 80. Note that the voltage of the initialized floating diffusion layer 415 corresponds to the voltage of the floating diffusion layer 415 read in the period from time t13 to the time t14.

Furthermore, the APS drive circuit 26 sets the voltage level of BLG to the low level. As a result, the BL transistor 430 is turned off. Therefore, the bit line 425 is not connected to the BL ground 435.

In the period from the time t16 to time t18, the solid-state imaging element 20 performs the same processing as that in the period from time t12 to the time t14. Note that the processing in the period from the time t12 to the time t14 corresponds to the processing in the period from the time t2 to the time t4 of the first embodiment.

In the period from the time t18 to time t20, the solid-state imaging element 20 performs the same processing as that in the period from the time t14 to the time t16. Here, TX1 is replaced with TX2. The first transfer transistor 411 is replaced with the second transfer transistor 412. The first photodiode 401 is replaced with the second photodiode 402.

In the period from the time t20 to time t22, the solid-state imaging element 20 performs the same processing as that in the period from the time t12 to the time t14.

In the period from the time t22 to time t24, the solid-state imaging element 20 performs the same processing as that in the period from the time t14 to the time t16. Here, TX1 is replaced with TX3. The first transfer transistor 411 is replaced with the third transfer transistor 413. The first photodiode 401 is replaced with the third photodiode 403.

In the period from the time t24 to time t26, the solid-state imaging element 20 performs the same processing as that in the period from the time t12 to the time t14.

In the period from the time t26 to time t28, the solid-state imaging element 20 performs the same processing as that in the period from the time t14 to the time t16. Here, TX1 is replaced with TX4. The first transfer transistor 411 is replaced with the fourth transfer transistor 414. The first photodiode 401 is replaced with the fourth photodiode 404.

At the time t28, the solid-state imaging element 20 performs the same processing as that at the time t6. Here, TX is replaced with TX1, TX2, TX3, and TX4. The transfer transistor 410 is replaced with the first transfer transistor 411, the second transfer transistor 412, the third transfer transistor 413, and the fourth transfer transistor 414. The photodiode 400 is replaced with the first photodiode 401, the second photodiode 402, the third photodiode 403, and the fourth photodiode 404.

By repeating the above sequence multiple times, the solid-state imaging element 20 generates the luminance image as a frame. Next, detection of the event by the solid-state imaging element 20 will be described.

It is assumed that the vehicle on which the imaging apparatus 10 is mounted is operated, for example, in a state in which a driving assistance system that performs PCS control and the like is operating. At this time, the system of the vehicle outputs a signal, indicating that the driving assistance system is operating, to the control unit 85. With the signal of this system, the control unit 85 outputs a signal for generating the event to the DVS drive circuit 28 and the APS drive circuit 26.

At this time, the DVS drive circuit 28 sets Vb of each pixel block 300 to the predetermined voltage Vb_P. As a result, the switching transistor 600 is turned on. Note that the predetermined voltage Vb_P is higher than the ground voltage Vb_G and lower than the voltage of the switching power supply 605.

The APS drive circuit 26 sets the voltage level of RST of each pixel block 300 to the high level. As a result, the reset transistor 440 is turned on. As a result, a voltage from the FB power supply 615 is applied to the floating diffusion layer 415 via the feedback transistor 610 and the reset transistor 440, so that the voltage of the floating diffusion layer 415 becomes a voltage corresponding to the voltage of the FB power supply 615. The voltage of the floating diffusion layer 415 is applied to the gate of the amplifier transistor 50, so that the amplifier transistor 50 is turned on. Note that the voltage corresponding to the voltage of the FB power supply 615 is higher than the voltage of the PD ground 405 and lower than the voltage of the FB power supply 615.

Furthermore, the APS drive circuit 26 sets the voltage levels of TX1, TX2, TX3, and TX4 of each pixel block 300 to the high levels. Therefore, the first transfer transistor 411, the second transfer transistor 412, the third transfer transistor 413, and the fourth transfer transistor 414 are turned on. At this time, the first transfer transistor 411 transfers a charge, corresponding to the photocurrent flowing from the first photodiode 401, to the floating diffusion layer 415. The second transfer transistor 412 transfers a charge, corresponding to the photocurrent flowing from the second photodiode 402, to the floating diffusion layer 415. The third transfer transistor 413 transfers a charge, corresponding to the photocurrent flowing from the third photodiode 403, to the floating diffusion layer 415. The fourth transfer transistor 414 transfers a charge, corresponding to the photocurrent flowing from the fourth photodiode 404, to the floating diffusion layer 415. As a result, the voltage of the floating diffusion layer 415 changes from the voltage corresponding to the voltage of the FB power supply 615.

In addition, the APS drive circuit 26 sets the voltage levels of SEL and BLG of each pixel block 300 to the high levels. Therefore, the select transistor 420 and the BL transistor 430 are turned on. At this time, the voltage of the source of the amplifier transistor 50 becomes the voltage of the BL ground 435.

The operational amplifier 620 amplifies a voltage from the amplifier transistor 50, and applies the amplified voltage to the first comparator 621 and the second comparator 622. In addition, on the basis of the signals from the first comparator 621 and the second comparator 622, the logic circuit 625 outputs, to the signal processing unit 70, the position of the pixel block 300 and the polarity of the event that correspond to the logic circuit 625. The signal processing unit 70 generates the event frame by performing signal processing, such as image recognition processing, on the position of the pixel 30 and the polarity of the event. Furthermore, the signal processing unit 70 stores the position of the pixel 30 and the polarity of the event in the storage unit 80, and stores the generated event frame in the storage unit 80.

After outputting to the signal processing unit 70, the logic circuit 625 resets the signal from the first comparator 621 and the signal from the second comparator 622. Furthermore, the logic circuit 625 outputs a signal, indicating that they have been reset, to the operational amplifier 620. At this time, the operational amplifier 620 amplifies the input voltage and applies the amplified voltage to the first comparator 621 and the second comparator 622. Therefore, the detection of the event by the operational amplifier 620, the first comparator 621, the second comparator 622, and the logic circuit 625 is repeated.

In addition, the difference between the voltages of the drain and the gate of the amplifier transistor 50 changes, so that the voltage to be applied from the amplifier transistor 50 to the gate of the feedback transistor 610 changes. Therefore, the driving force of the feedback transistor 610 changes, so that the ease of current flow from the feedback transistor 610 to the floating diffusion layer 415 via the reset transistor 440 changes. Therefore, at this time, the voltage of the floating diffusion layer 415 is changed by a voltage from the feedback transistor 610. Therefore, the voltage nears the voltage before the photocurrents are generated by the first photodiode 401, the second photodiode 402, the third photodiode 403, and the fourth photodiode 404. Therefore, the state of the floating diffusion layer 415 easily returns to the state before the photocurrents are generated by the first photodiode 401, the second photodiode 402, the third photodiode 403, and the fourth photodiode 404. Therefore, the voltage responsiveness of the floating diffusion layer 415 is improved, so that the responsiveness of the signal output from the logic circuit 625 is improved.

As described above, the solid-state imaging element 20 detects the event. Also, in the third embodiment, the same effects as those of the first embodiment are exerted. In the third embodiment, the following effects are also exerted.

The solid-state imaging element 20 includes the first pixel 301, the second pixel 302, and the image processing unit 75. The first pixel 301 includes the first photodiode 401. The first photodiode 401 generates, by photoelectric conversion, a photocurrent corresponding to an amount of light. The second pixel 302 includes the second photodiode 402. The second photodiode 402 generates, by photoelectric conversion, a photocurrent corresponding to the amount of light of a color different from the color of the light that reacts in the first photodiode 401. The first pixel 301 and the second pixel 302 share the floating diffusion layer 415, the switching power supply 605, the DVS drive circuit 28, the amplifier transistor 50, the first comparator 621, and the second comparator 622. When Vb is the ground voltage Vb_G, the image processing unit 75 generates the luminance image on the basis of a change in the voltage output from the source of the amplifier transistor 50. Note that the first photodiode 401 corresponds to a first photoelectric conversion element. The second photodiode 402 corresponds to a second photoelectric conversion element.

As a result, the color of the light reacting with the first photodiode 401 is different from the color of the light reacting with the second photodiode 402, so that the solid-state imaging element 20 can detect events for multiple colors.

Fourth Embodiment

A fourth embodiment is different from the first embodiment in the form of a switching transistor 600. Others are the same as those of the first embodiment.

Figure 10:
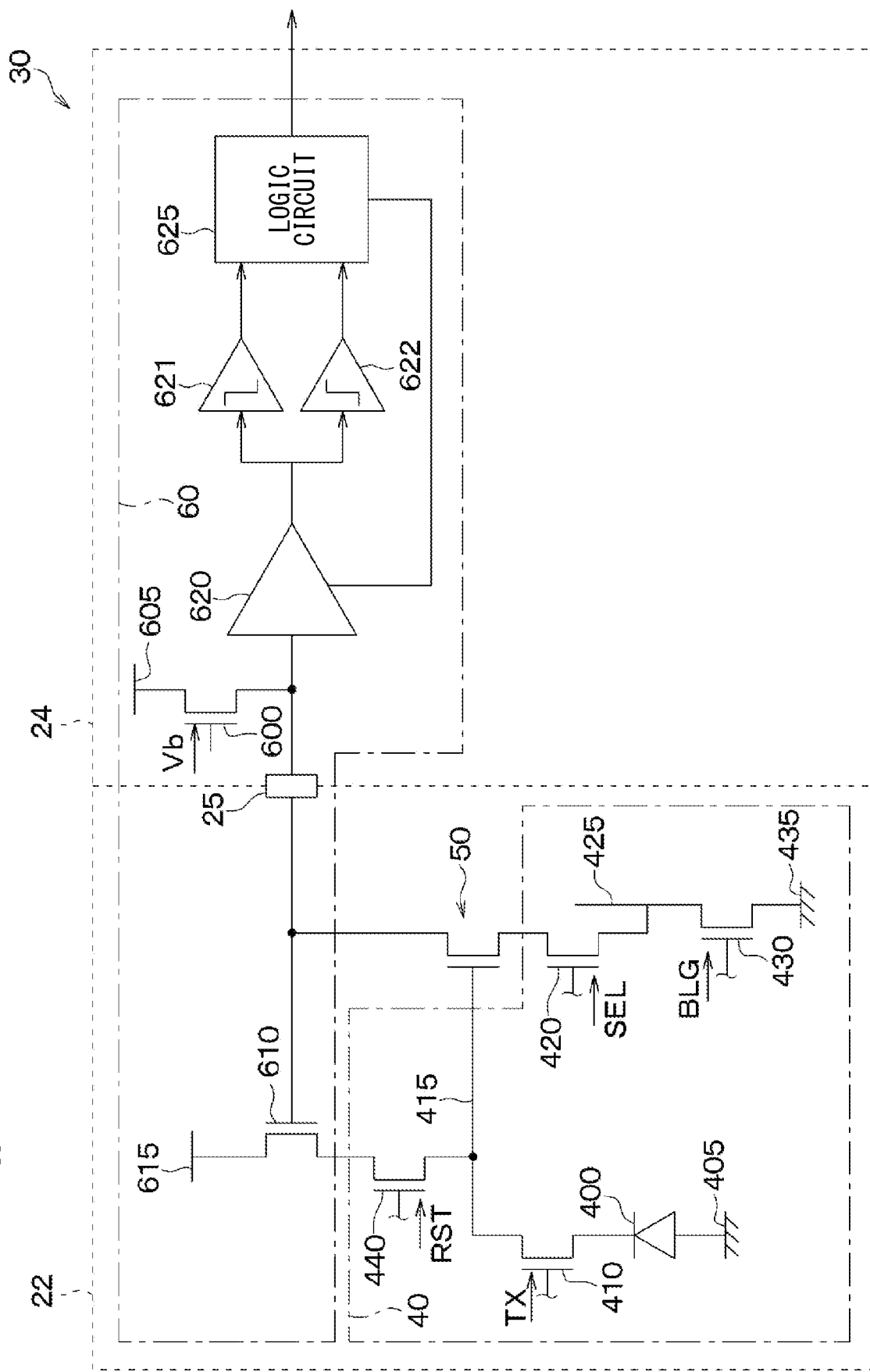
FIG. 10 illustrates a structural view of a pixel of a solid-state imaging element according to a fourth embodiment.

As illustrated in FIG. 10, the switching transistor 600 is an N-channel MOSFET. In this case, when the luminance image is generated, the DVS drive circuit 28 sets Vb to be equal to or higher than the voltage of the switching power supply 605. As a result, the switching transistor 600 is turned on. Therefore, a voltage from the switching power supply 605 is applied to the drain of the amplifier transistor 50 via the switching transistor 600 and the joint portion 25. As a result, the voltage of the drain of the amplifier transistor 50 becomes higher than the sum of the gate voltage of the amplifier transistor 50 and a threshold voltage, so that the state of the amplifier transistor 50 is saturated. Therefore, a voltage from the floating diffusion layer 415 is applied to the select transistor 420 via the amplifier transistor 50. Furthermore, a voltage from the switching power supply 605 is applied to the gate of the feedback transistor 610 via the switching transistor 600 and the joint portion 25, so that the feedback transistor 610 is turned on. Thereafter, the solid-state imaging element 20 performs the same processing as that of the first embodiment, thereby generating the luminance image.

When the event is detected, the DVS drive circuit 28 sets Vb of each pixel 30 to the predetermined voltage Vb_P. As a result, the switching transistor 600 is turned on. Thereafter, the solid-state imaging element 20 performs the same processing as that of the first embodiment, thereby detecting the event. Note that the predetermined voltage Vb_P is higher than the ground voltage Vb_G and lower than the voltage of the switching power supply 605.

The fourth embodiment is configured as described above. Also, in the fourth embodiment, the same effects as those of the first embodiment are exerted.

Other Embodiments

The present disclosure is not limited to the above embodiments, and can be appropriately modified from the above embodiments. In addition, in each of the above embodiments, it goes without saying that the elements constituting the embodiment are not necessarily essential except for a case where it is explicitly stated that the elements are particularly essential and a case where the elements are considered to be obviously essential in principle.

The detection unit, the processing unit, and the methods thereof described in the present disclosure may be realized by a dedicated computer provided by configuring a processor, programmed to execute one or more functions embodied by a computer program, and a memory. Alternatively, the detection unit, the processing unit, and the methods thereof described in the present disclosure may be realized by a dedicated computer provided by configuring a processor with one or more dedicated hardware logic circuits. Alternatively, the detection unit, the processing unit, and the methods thereof described in the present disclosure may be realized by one or more dedicated computers configured by a combination of a processor programmed to execute one or more functions, a memory, and a processor configured by one or more hardware logic circuits. In addition, the computer program may be stored in a computer-readable non-transition tangible recording medium as an instruction to be executed by a computer.

In the above embodiments, the imaging apparatus 10 is mounted on a vehicle. On the other hand, the imaging apparatus 10 is not limited to being mounted on a vehicle, and may be mounted on, for example, an industrial robot or the like.

In the above embodiments, the joint portion 25 is disposed between the feedback transistor 610 and the operational amplifier 620. On the other hand, the joint portion 25 is not limited to being disposed between the feedback transistor 610 and the operational amplifier 620. The joint portion 25 may be disposed, for example, between the source of the switching transistor 600 and the operational amplifier 620. Alternatively, the joint portion 25 may be disposed between the source of the feedback transistor 610 and the drain of the reset transistor 440.

In the above embodiments, the solid-state imaging element 20 includes the multiple pixels 30. On the other hand, the number of the pixels 30 is not limited to two or more, but may be one or more.

In the above third embodiment, when the event is detected, the APS drive circuit 26 sets the voltage levels of TX1, TX2, TX3, and TX4 of each pixel block 300 to the high levels. On the other hand, when the event is detected, the APS drive circuit 26 is not limited to setting the voltage levels of TX1, TX2, TX3, and TX4 of each pixel block 300 to the high levels. When the event is detected, the APS drive circuit 26 may set the voltage level of at least one of TX1, TX2, TX3, and TX4 of each pixel block 300 to the high level.

In the above third embodiment, the pixel block 300 includes four pixels. On the other hand, the pixel block 300 is not limited to including four pixels. The pixel block 300 may include two or more pixels.

The present disclosure has been described based on examples, but it is understood that the present disclosure is not limited to the examples or structures. The present disclosure encompasses various modifications and variations within the scope of equivalents. In addition, various combinations and configurations, as well as other combinations and configurations that include only one element, more, or less, fall within the scope and spirit of the present disclosure.

What is claimed is:

1. A solid-state imaging element comprising:
   a pixel including
   a photoelectric conversion element configured to generate, by photoelectric conversion, a photocurrent corresponding to an amount of light,
   a charge accumulation unit configured to
   accumulate a charge corresponding to the photocurrent, and
   output a voltage corresponding to an amount of the charge accumulated in the charge accumulation unit,
   a power supply,
   a transistor configured to be connected to the power supply,
   a drive circuit configured to apply a voltage to the transistor to turn on the transistor,
   a common transistor having a first terminal and a second terminal, the common transistor configured to
   maintain a voltage of the first terminal at a predetermined voltage with a voltage applied from the power supply and output a voltage corresponding to a change in the voltage of the charge accumulation unit from the second terminal, based on a condition that an element voltage as the voltage applied from the drive circuit to the transistor is a ground voltage,
   output a voltage corresponding to a change in the voltage of the charge accumulation unit from the first terminal, based on a condition that the element voltage is higher than the ground voltage, and
   a detection unit configured to detect whether the voltage from the first terminal of the common transistor has increased or decreased; and
   an image processing unit configured to generate a luminance image based on a change in the voltage output from the second terminal of the common transistor, based on a condition that the element voltage is the ground voltage.

2. The solid-state imaging element according to claim 1, wherein the power supply is a first power supply, wherein the transistor is a first transistor, wherein the drive circuit is a first drive circuit, wherein the pixel further includes:
   a second power supply;
   a second transistor configured to be connected to the second power supply; and
   a second drive circuit configured to apply a voltage to the second transistor to turn on the second transistor, wherein the second transistor is configured to be turned on to apply a voltage from the second power supply to the charge accumulation unit to set the voltage of the charge accumulation unit to a voltage corresponding to the voltage of the second power supply, based on a condition that the element voltage is higher than the ground voltage, and wherein the common transistor is further configured to output a voltage corresponding to a change in the voltage of the charge accumulation unit from the first terminal, after the second transistor sets the voltage of the charge accumulation unit to the voltage corresponding to the voltage of the second power supply.

3. A solid-state imaging element comprising:
   a first pixel including a first photoelectric conversion element configured to generate, by photoelectric conversion, a first photocurrent corresponding to an amount of light;
   a second pixel including a second photoelectric conversion element configured to generate, by photoelectric conversion, a second photocurrent corresponding to an amount of light of a color different from a color of light that reacts in the first photoelectric conversion element; and
   an image processing unit,
   wherein the first pixel and the second pixel jointly include:
   a charge accumulation unit configured to accumulate a charge corresponding to the first photocurrent and the second photocurrent, and output a voltage corresponding to an amount of the charge accumulated in the charge accumulation unit;

a power supply;

a transistor configured to be connected to the power supply;

a drive circuit configured apply a voltage to the transistor to turn on the transistor;

a common transistor having a first terminal and a second terminal, the common transistor configured to maintain a voltage of the first terminal at a predetermined voltage with a voltage applied from the power supply and output a voltage corresponding to a change in the voltage of the charge accumulation unit from the second terminal, based on a condition that an element voltage as the voltage applied from the drive circuit to the transistor is a ground voltage, output a voltage corresponding to a change in the voltage of the charge accumulation unit from the first terminal, based on a condition that the element voltage is higher than the ground voltage; and a detection unit configured to detect whether the voltage from the first terminal of the common transistor has increased or decreased, and wherein the image processing unit is configured to generate a luminance image according to a change in the voltage output from the second terminal of the common transistor, based on a condition that the element voltage is the ground voltage.

4. A solid-state imaging element comprising:

a pixel including a photoelectric conversion element configured to generate, by photoelectric conversion, a photocurrent corresponding to an amount of light, a charge accumulation unit configured to accumulate a charge corresponding to the photocurrent, and output a voltage corresponding to an amount of the charge accumulated in the charge accumulation unit, a power supply, a transistor configured to be connected to the power supply, a drive circuit configured to apply a voltage to the transistor to turn on the transistor, a common transistor having a first terminal and a second terminal, the common transistor configured to maintain a voltage of the first terminal at a predetermined voltage with a voltage applied from the power supply and output a voltage corresponding to a change in the voltage of the charge accumulation unit from the second terminal, based on a condition that an element voltage as the voltage applied from the drive circuit to the transistor is equal to or higher than the voltage of the power supply, output a voltage corresponding to a change in the voltage of the charge accumulation unit from the first terminal, based on a condition that the element voltage is lower than the voltage of the power supply, a detection unit configured to detect whether the voltage from the first terminal of the common transistor has increased or decreased; and an image processing unit configured to generate a luminance image according to a change in the voltage output from the second terminal of the common transistor, based on a condition that the element voltage is equal to or higher than the voltage of the power supply.

* * * * *